United States Patent
Hao

(10) Patent No.: US 9,150,062 B2
(45) Date of Patent: Oct. 6, 2015

(54) ARTICULATED CHASSIS SYSTEM OF LARGE ARTICULATED VEHICLE

(76) Inventor: Yun Hao, Dandong (CN)

( * ) Notice: Subject to any disclaimer, the term of this patent is extended or adjusted under 35 U.S.C. 154(b) by 0 days.

(21) Appl. No.: 13/700,628

(22) PCT Filed: Dec. 29, 2010

(86) PCT No.: PCT/CN2010/080462
§ 371 (c)(1),
(2), (4) Date: Nov. 28, 2012

(87) PCT Pub. No.: WO2011/150653
PCT Pub. Date: Dec. 8, 2011

(65) Prior Publication Data
US 2013/0062860 A1 Mar. 14, 2013

(30) Foreign Application Priority Data

| Jun. 2, 2010 | (CN) | 2010 2 0211872 |
| Jun. 2, 2010 | (CN) | 2010 2 0211875 U |
| Jun. 2, 2010 | (CN) | 2010 2 0211901 |
| Jun. 17, 2010 | (CN) | 2010 2 0226770 |
| Jun. 23, 2010 | (CN) | 2010 2 0233715 |
| Jul. 30, 2010 | (CN) | 2010 2 0276171 |
| Sep. 25, 2010 | (CN) | 2010 2 0539553 |

(51) Int. Cl.
| B60D 1/44 | (2006.01) |
| B60D 1/01 | (2006.01) |
| B60D 5/00 | (2006.01) |
| B62D 12/00 | (2006.01) |
| B62D 15/02 | (2006.01) |
| B62D 53/08 | (2006.01) |

(52) U.S. Cl.
CPC .. *B60D 1/01* (2013.01); *B60D 5/00* (2013.01); *B62D 12/00* (2013.01); *B62D 15/021* (2013.01); *B62D 53/0842* (2013.01); *B62D 53/0871* (2013.01)

(58) Field of Classification Search
CPC ......... B60D 1/01; B60D 5/00; B60D 53/0871
USPC ...................................... 280/492, 432, 446.1
See application file for complete search history.

(56) References Cited

U.S. PATENT DOCUMENTS

| 4,405,145 A * | 9/1983 | Bergman et al. .............. 280/432 |
| 5,332,247 A | 7/1994 | Etherington |
| 6,437,701 B1 * | 8/2002 | Muller .......................... 340/679 |

FOREIGN PATENT DOCUMENTS

| CN | 201086609 A | 7/2007 |
| CN | 201086610 A | 7/2007 |
| CN | 101168345 A | 4/2008 |

(Continued)

OTHER PUBLICATIONS

International Search Report corresponding in PCT/CN2010/080462 dtd Mar. 7, 2011.

*Primary Examiner* — Joseph Rocca
*Assistant Examiner* — Marlon Arce
(74) *Attorney, Agent, or Firm* — Banner & Witcoff, Ltd.

(57) ABSTRACT

The present invention relates to an articulated chassis system of large articulated vehicle, which comprises a front beam, a spherical hinge connecting structure, a front frame, a turnplate bearing, a rear frame, a rear beam and a turning angle sensing means, the front beam is connected with the front frame through the spherical hinge connecting structure, the turnplate bearing comprises an inner ring and an outer ring, the front frame is connected fixedly with the outer ring/the inner ring, the rear frame is connected fixedly with the inner ring/the outer ring, the inner ring and the outer ring can rotate relatively, the rear frame is connected with the rear beam, the turning angle sensing means is arranged between the inner ring/the outer ring and the front frame/the rear frame. Preferably, the articulated chassis system of large articulated vehicle further comprises a hydraulic damping buffer system arranged between the front frame and the rear frame, the turning angle sensing means comprises an angle sensor, a first angle sensor and a second angle sensor, the spherical hinge connecting structure comprises a spherical hinge bracket structure and a spherical hinge. The present invention is designed uniquely and skillfully, has a simple and compact structure, is easy to install, so as to enhance the safety, stability and durability of the articulated chassis system of large articulated vehicle, and lower the cost, therefore the present invention is suitable for large-scale popularization.

44 Claims, 14 Drawing Sheets

(56) References Cited

FOREIGN PATENT DOCUMENTS

| CN | 2010991554 A | 8/2008 |
| CN | 101376403 A | 3/2009 |
| CN | 201400056 Y | 2/2010 |
| EP | 0545046 A1 | 6/1993 |
| WO | 9517328 A1 | 6/1995 |

* cited by examiner

ARTICULATED CHASSIS SYSTEM OF LARGE ARTICULATED VEHICLE

The present application is a U.S. National Phase Application Under 35 USC §371 and applicant herewith claims the benefit of priority of PCT/CN2010/080462 filed Dec. 29, 2010 which claims priority to CN Application No. 201020539553.1 filed Sep. 25, 2010, which claims priority to CN Application No. 201020276171.4 filed Jul. 30, 2010 which claims priority to CN Application No. 201020233715.9 filed Jun. 23, 2010 which claims priority to CN Application No. 201020226770.5 filed Jun. 17, 2010 which claims priority to CN Application No. 201020211901.2 filed Jun. 2, 2010 which claims priority to CN Application No. 201020211872.X filed Jun. 2, 2010 which claims priority to CN Application No. 201020211875.3 filed Jun. 2, 2010 which are incorporated by reference herein in their entireties.

FIELD OF TECHNOLOGY

The present invention relates to the field of vehicle structure, especially to the field of the articulating of vehicle chassis, in particular to an articulated chassis system of large articulated vehicle.

DESCRIPTION OF RELATED ARTS

With the rapid development of our country's automobile manufacturing industry, various vehicle manufacturing industries are also developed rapidly, articulated buses, with the characteristics of great capacity, high utilization coefficient and so on, are promoted gradually in the domestic big and middle cities. The articulated buses are usually consisted of a front compartment, a rear compartment and an articulated chassis system connecting the front and rear compartments, and so on, wherein the articulated chassis system comprises a turnplate bearing, a front frame, a rear frame, and a damping system, etc., wherein:

The front frame is connected fixedly with the front compartment through a front beam, wherein the front frame is generally connected with the front beam by a spherical hinge connecting mechanism such as a spherical hinge and a spherical hinge fixing seat and so on, and the spherical hinge is generally consisted of a metal core and an elastic element and so on, for example, the Chinese patent CN201099154 discloses a spherical hinge connecting mechanism in an articulated chassis system of large articulated bus, wherein the front frame is connected fixedly with the front beam by a spherical hinge and a spherical hinge fixing seat, and the spherical hinge fixing seat is a plate with double layers, which is relatively thin, and the connection rigidity is not desirable, while when the vehicle is running, the traction force or the thrust force acted on the spherical hinge connecting mechanism is relatively large, which puts forward higher requirements to the rigidity of the spherical hinge connection mechanism, once fault occurs in the spherical hinge connecting mechanism, it will cause a relatively serious traffic accident. In the above spherical hinge connecting mechanism, rubber is casted outside of the middle part of the rigid central axis, the rigidity of this structure is relatively weak, and at the same time, for the force acted on the central axis of the spherical hinge by the vehicle during the process of bumping up and down, and the process of turning left and right is relatively large, it is easy to make the central axis of the spherical hinge move left and right in the elastic member, affecting the running stability of the articulated vehicle, and at the same time, for the action force is relatively large, the spherical hinge is easily damaged.

The front frame is connected with the rear frame through a turnplate bearing, wherein the front frame is connected fixedly with the outer ring of the turnplate bearing through a beam, and the rear frame is connected fixedly with the inner ring of the turnplate bearing, the rotation of the front frame and the rear frame can achieve the free turning of the articulated vehicle, for example, the Chinese patent CN201086609 published an articulated chassis system of large articulated bus, wherein the front frame is connected fixedly with the outer ring of the turnplate bearing through a beam, and the rear frame is connected fixedly with the inner ring of the turnplate bearing, though a better rotational connection is achieved, the structure is relatively complicated, and the cost is relatively high, furthermore a multilayer structure is formed through connection, resulting in a relatively big size in the thickness of the whole articulated system. Meanwhile, due to the structural limitations, the screws on the turnplate bearing are arranged unevenly and the connection strength is poor, if it is used for a long-term, the service life will be affected.

The rear frame is connected fixedly with the rear compartment of the articulated vehicle through a rear beam, in the prior art, in order to reduce the quality of the rear beam, the rear beam is always made into a stamping part structure, the rear frame and the rear compartment are welded through the rear beam, due to the stamping part structure, the connection strength is relatively poor, and as the connecting member of the rear frame and the rear compartment, the requirement to the rigidity of the rear beam is relatively high, once fault occurs, it will be easy to cause a relatively serious traffic accident, and at the same time, for the structure is relatively complicated, it is hard to be mounted.

As mentioned above, for the front frame is connected fixedly with the outer ring of the turnplate bearing through a beam, and the rear frame is connected fixedly with the inner ring of the turnplate bearing, the rotation of the front frame and the rear frame can achieve the free turning of the articulated vehicle, though the requirement of the turning of the articulated vehicle to the width of the road is not very high, which is a major advantage of city articulated buses, if the turning angle is too big (especially for the articulated buses with rear engine), the lateral force generated by the rear compartment to the front compartment will increase, if seriously, causing sideslip, which is called the "shear" accident of the front and rear compartments of the articulated vehicle in the industry, resulting in property losses and casualties.

In addition, when the vehicle turns in the running forward process, an anti-torsion force is generated between the rear frame and the inner ring of the turnplate bearing connected therewith, in the prior art, usually only a plurality of screw connections are arranged to achieve such an anti-torsion force, for example, the Chinese patent CN201086610 disclosed a rear truss structure in the articulated chassis system of large articulated buses, although it achieves a rotational connection, but due to the structural limitations, on the one hand, the screws are arranged only in local regions, the arrangement is not even enough, the anti-torsion force is poor, on the other hand, the torsion force formed acts on the screws directly, if it is used for a long term, the service life will be affected, and the rear frame structure is relatively complicated, the cost is relatively high, and the processing technology is complex.

The damping system, i.e. the hydraulic buffer system, in the articulated chassis system is a key factor that restricts the performance of articulated buses, in the prior art, the hydraulic buffer system of the articulated bus is generally consisted of two hydraulic cylinders, a hydraulic controller and an electrical control system, the hydraulic cylinders are controlled by the hydraulic controller to change the output resistance, according to the turning angle of the vehicle, the electrical control system signals the hydraulic controller to make it change different pressure values, for example, the Chinese patent CN201086607 disclosed a hydraulic control system that control the hydraulic damping by rotating a control body, so as to change the buffer damping, though this kind of control system can form different damping according to the angle change of the vehicle, and play a significant effect in preventing the shearing of the front and rear compartments, the structure of the control body is relatively complicated, has a high processing precision requirement, a relatively high cost, cumbersome to install and connect, occupies a large space, and has the shortcomings of oil leaking, valve core deadlocking or electrical system failure, and so on.

At the same time, for the buffer effect of the hydraulic damping system of the prior art is not ideal, especially when used in the articulated bus, if the damping buffer can not be controlled effectively, when one driver drives an articulated car especially in a big turn, an accident would occur often because the turning angle is too big, causing casualties and property losses.

Therefore, there is a need to improve the articulated chassis system of large articulated vehicle of the prior art, in order to overcome one or more of the above drawbacks, so as to enhance the safety, stability and durability of the articulated chassis system of large articulated vehicle, simplify the structure, and lower the cost.

SUMMARY OF THE INVENTION

Aspects of the present invention generally pertain to an articulated chassis system of large articulated vehicle, and the articulated chassis system of large articulated vehicle is designed uniquely and skillfully, has a simple and compact structure, is easy to install, so as to enhance the safety, stability and durability of the articulated chassis system of large articulated vehicle, and lower the cost, therefore the present invention is suitable for large-scale popularization.

In order to realize the above aims, in a first aspect of the present invention, an articulated chassis system of large articulated vehicle is provided, and comprises a front beam, a spherical hinge connecting structure, a front frame, a turnplate bearing, a rear frame and a rear beam, the front beam is connected with the front frame through the spherical hinge connecting structure, the turnplate bearing comprises an inner ring and an outer ring, the front frame is connected fixedly with the outer ring/the inner ring, the rear frame is connected fixedly with the inner ring/the outer ring, the inner ring and the outer ring can rotate relatively, the rear frame is connected with the rear beam, characterized in that, the articulated chassis system of large articulated vehicle further comprises a turning angle sensing means, the turning angle sensing means is arranged between the inner ring/the outer ring and the front frame/the rear frame.

The turning angle sensing means in the articulated chassis system of large articulated vehicle comprises an angle sensor, a first angle sensor and a second angle sensor, the angle sensor is arranged fixedly on the inner ring/the outer ring, the first angle sensor and the second angle sensor are arranged fixedly on the front frame/the rear frame, and the first angle sensor and the second angle sensor are arranged at two sides of the angle sensor respectively.

The first angle sensor and the second angle sensor in the articulated chassis system of large articulated vehicle comprises an alarm end and a mechanical locking end respectively, the alarm end and the angle sensor form an angle of 40°~50° in the circumferential direction of the inner ring/the outer ring, the mechanical locking end and the angle sensor form an angle of 45°~55° in the circumferential direction of the inner ring/the outer ring.

The alarm end and the angle sensor in the articulated chassis system of large articulated vehicle form an angle of 47° in the circumferential direction of the inner ring/the outer ring, the mechanical locking end and the angle sensor form an angle of 52° in the circumferential direction of the inner ring/the outer ring.

The turning angle sensing means in the articulated chassis system of large articulated vehicle further comprises a damping sensor, a first damping sensor and a second damping sensor, the damping sensor is arranged on the inner ring, the damping sensor and the angle sensor are arranged on the center line of the articulated system, the first damping sensor and the second damping sensor are arranged on the front frame/the rear frame respectively, and the first damping sensor and the second damping sensor are arranged at two sides of the damping sensor respectively.

The first damping sensor and the second damping sensor in the articulated chassis system of large articulated vehicle comprises a damping end and a hydraulic locking end respectively, the damping end and the damping sensor form an angle of 15°~20° in the circumferential direction of the inner ring/ the outer ring, the hydraulic locking end and the damping sensor form an angle of 45°~55° in the circumferential direction of the inner ring/the outer ring.

The damping end and the damping sensor in the articulated chassis system of large articulated vehicle form an angle of 17° in the circumferential direction of the inner ring/the outer ring, the hydraulic locking end and the damping sensor form an angle of 49° in the circumferential direction of the inner ring/the outer ring.

The articulated chassis system of large articulated vehicle further comprises a hydraulic damping buffer system, and the hydraulic damping buffer system is arranged between the front frame and the rear frame.

The hydraulic damping buffer system in the articulated chassis system of large articulated vehicle includes two hydraulic damping buffer devices arranged left and right symmetrically and a damping buffer control module, each of the hydraulic damping buffer devices includes a piston, a piston rod and a cylinder liner, the piston is arranged in the cylinder liner, and one side of the piston is connected fixedly with the piston rod, the piston rod is connected fixedly with the front frame, the end of the cylinder liner of each of the hydraulic damping buffer devices is connected fixedly with the rear frame, the damping buffer control module is connected with the left damping buffer device and the right damping buffer device.

The hydraulic damping buffer device in the articulated chassis system of large articulated vehicle is a hydraulic cylinder, the hydraulic cylinder is divided by the piston into a rod chamber and a rodless chamber, the damping buffer control module includes a first one-way valve, a second one-way valve, a third one-way valve, a fourth one-way valve and an oil reservoir, the rodless chamber is sequentially connected with the third one-way valve and the oil reservoir in series to form a first oil suction circuit, the rod chamber is sequentially connected with the fourth one-way valve and the oil reservoir in series to form a second oil suction circuit; the rodless chamber is sequentially connected with the first one-way valve and the oil reservoir in series to form a first oil discharge circuit, the rod chamber is sequentially connected with the second one-way valve and the oil reservoir in series to form a second oil discharge circuit; at least one hydraulic damping unit is connected in series in each of the first oil discharge circuit and the second oil discharge circuit.

The damping buffer control module in the articulated chassis system of large articulated vehicle comprises a rod chamber integrated block and a rodless chamber integrated block arranged independently, the first oil suction circuit and the first oil discharge circuit are arranged inside the rodless chamber integrated block, the second oil suction circuit and the second oil discharge circuit are arranged inside the rod chamber integrated block.

The rod chamber integrated block and the rodless chamber integrated block in the articulated chassis system of large articulated vehicle are arranged at two ends of the cylinder liner respectively, a housing is arranged to surround the rod chamber integrated block, the cylinder liner and the rodless chamber integrated block, and the oil reservoir is a sealed space formed between the cylinder liner, the housing, the rodless chamber integrated block and the rod chamber integrated block.

The damping buffer control module in the articulated chassis system of large articulated vehicle further comprises a first solenoid valve and a hydraulic damping supercharging unit, the first solenoid valve and the hydraulic damping supercharging unit are connected with each other in parallel and then connected into the first oil discharge circuit and the second oil discharge circuit, the first damping sensor is connected electrically with the first solenoid valve.

The damping buffer control module in the articulated chassis system of large articulated vehicle further comprises a relief valve and a second solenoid valve, the relief valve and the second solenoid valve are connected with each other in parallel and then connected into the first oil discharge circuit and the second oil discharge circuit, and the relief valve and the second solenoid valve are located at the downstream position of the first solenoid valve and the hydraulic damping supercharging unit, the second damping sensor is connected electrically with the second solenoid valve.

A pressure sensor is arranged at the upstream position of the hydraulic damping supercharging unit in the first oil discharge circuit and the second oil discharge circuit in the articulated chassis system of large articulated vehicle.

A pressure measuring port is arranged in the first oil discharge circuit and/or the second oil discharge circuit of the hydraulic cylinder in the articulated chassis system of large articulated vehicle.

The turning angle sensing means in the articulated chassis system of large articulated vehicle further comprises a buffer block and a buffer end, the buffer block is arranged on the front frame/the rear frame, the buffer end is arranged on the rear frame/the front frame.

The angle sensor in the articulated chassis system of large articulated vehicle is connected electrically with an alarm device.

The thickness of the outer ring in the articulated chassis system of large articulated vehicle is less than the thickness of the inner ring.

A steel ball raceway is formed in the circumferential direction at the joint of the inner ring and the outer ring in the articulated chassis system of large articulated vehicle, and filled with steel balls inside, the relative rotation of the inner ring and the outer ring is achieved through the steel balls.

At least one lubrication port is arranged on the inner ring in the articulated chassis system of large articulated vehicle, a fixing seat is arranged on the rear frame, a centralized lubricator is arranged fixedly on the fixing seat and connected with the lubrication port through a pipe.

The rear frame/the front frame in the articulated chassis system of large articulated vehicle includes a bearing support portion and an annular projection, the annular projection is arranged on the upper side of the bearing support portion, the inner ring is mounted on the bearing support portion and surrounds the outer side of said annular projection.

The rear frame/the front frame in the articulated chassis system of large articulated vehicle is formed integrally by casting.

The spherical hinge connecting structure in the articulated chassis system of large articulated vehicle comprises a spherical hinge bracket structure and a spherical hinge, the spherical hinge bracket structure includes a bracket fixing plate, a first fixing seat and a second fixing seat, the bracket fixing plate is fixed on the front beam, the spherical hinge is inserted movably in the front frame, the first fixing seat and the second fixing seat are arranged at the same side of the bracket fixing plate, a threaded hole is arranged on each of the first fixing seat and the second fixing seat, and grooves are arranged symmetrically on the first fixing seat and the second fixing seat.

The spherical hinge in the articulated chassis system of large articulated vehicle comprises a metal core, an elastic member and a support sheet, the elastic member is arranged at the middle position of the outer surface of the metal core, the support sheet is arranged outside of the elastic member, the metal core comprises a metal core main shaft and at least one position-limiting projection, the position-limiting projection is arranged on the outer surface of the metal core main shaft.

A plurality of buffer holes are arranged in the elastic member in the articulated chassis system of large articulated vehicle.

The spherical hinge connecting structure in the articulated chassis system of large articulated vehicle comprises at least two supporting sheets, the at least two supporting sheets form at least two slots at the joints.

The metal core main shaft and the position-limiting projection on the outer surface of the metal core main shaft in the articulated chassis system of large articulated vehicle are formed integrally.

The corners of the grooves in the articulated chassis system of large articulated vehicle are round angle structures, the corners of the supporting portions at two ends of the metal core main shaft are round angle structures, and the round angles of the corners of the supporting portions at two ends of the metal core main shaft are larger than those of the corners of the grooves.

The width of the groove in the horizontal direction in the articulated chassis system of large articulated vehicle is less than the width of the first fixing seat or the second fixing seat in the horizontal direction, a horizontal reinforcing portion is formed on each of the first fixing seat and the second fixing seat.

The depth of the groove in the vertical direction in the articulated chassis system of large articulated vehicle is less than the thickness of the first fixing seat or the second fixing seat in the vertical direction, a vertical reinforcing portion is formed on each of the first fixing seat and the second fixing seat.

An arc stress portion is formed on each of the first fixing seat and the second fixing seat in the articulated chassis system of large articulated vehicle, at the other side of the groove, and near the bracket fixing plate.

A reinforcing rib is arranged on the arc stress portion in the articulated chassis system of large articulated vehicle.

The spherical hinge bracket structure in the articulated chassis system of large articulated vehicle is formed integrally by casting.

The rear beam in the articulated chassis system of large articulated vehicle comprises a reinforcing portion and connecting portions welded to two ends of the reinforcing portion, a plurality of fixing threaded holes are arranged in the reinforcing portion, the rear frame includes a rear frame connecting portion, corresponding to the fixing threaded holes, a plurality of rear frame threaded holes are arranged on the rear frame connecting portion, the rear frame connecting portion is fixed by inserting bolts into the fixing threaded holes and the rear frame threaded holes respectively.

A wire hole is arranged in the reinforcing portion in the articulated chassis system of large articulated vehicle, corresponding to the wire hole, a rear frame wire hole is arranged in the rear frame connecting portion.

A plurality of lightening holes are arranged in the reinforcing portion in the articulated chassis system of large articulated vehicle.

The reinforcing portion in the articulated chassis system of large articulated vehicle is formed integrally by casting.

In a second aspect of the present invention, an articulated chassis system of large articulated vehicle is provided, and comprises a front beam, a spherical hinge connecting structure, a front frame, a turnplate bearing, a rear frame and a rear beam, the front beam is connected with the front frame through the spherical hinge connecting structure, the turnplate bearing comprises an inner ring and an outer ring, the front frame is connected fixedly with the outer ring, the rear frame is connected fixedly with the inner ring, the inner ring and the outer ring can rotate relatively, the rear frame is connected with the rear beam, characterized in that, the articulated chassis system of large articulated vehicle further comprises a turning angle sensing means and a hydraulic damping buffer system, the turning angle sensing means is arranged between the inner ring and the front frame, the hydraulic damping buffer system is arranged between the front frame and the rear frame, and the turning angle sensing means is connected electrically with the hydraulic damping buffer system.

The hydraulic damping buffer system in the articulated chassis system of large articulated vehicle includes two hydraulic damping buffer devices arranged left and right symmetrically and a damping buffer control module, each of the hydraulic damping buffer devices includes a piston, a piston rod and a cylinder liner, the piston is arranged in the cylinder liner, and one side of the piston is connected fixedly with the piston rod, the piston rod is connected fixedly with the front frame, the end of the cylinder liner of each of the hydraulic damping buffer devices is connected fixedly with the rear frame, the damping buffer control module is connected with the left damping buffer device and the right damping buffer device.

The hydraulic damping buffer device in the articulated chassis system of large articulated vehicle is a hydraulic cylinder, the hydraulic cylinder is divided by the piston into a rod chamber and a rodless chamber, the damping buffer control module includes a first one-way valve, a second one-way valve, a third one-way valve, a fourth one-way valve and an oil reservoir, the rodless chamber is sequentially connected with the third one-way valve and the oil reservoir in series to form a first oil suction circuit, the rod chamber is sequentially connected with the fourth one-way valve and the oil reservoir in series to form a second oil suction circuit; the rodless chamber is sequentially connected with the first one-way valve and the oil reservoir in series to form a first oil discharge circuit, the rod chamber is sequentially connected with the second one-way valve and the oil reservoir in series to form a second oil discharge circuit; at least one hydraulic damping unit is connected in series in each of the first oil discharge circuit and the second oil discharge circuit.

The damping buffer control module in the articulated chassis system of large articulated vehicle comprises a rod chamber integrated block and a rodless chamber integrated block arranged independently, the first oil suction circuit and the first oil discharge circuit are arranged inside the rodless chamber integrated bloc, the second oil suction circuit and said second oil discharge circuit are arranged inside the rod chamber integrated block.

The rod chamber integrated block and the rodless chamber integrated block in the articulated chassis system of large articulated vehicle are arranged at two ends of the cylinder liner respectively, a housing is arranged to surround the rod chamber integrated block, the cylinder liner and the rodless chamber integrated block, and the oil reservoir is a sealed space formed between the rod chamber integrated block, the cylinder liner and the rodless chamber integrated block and the housing.

The damping buffer control module in the articulated chassis system of large articulated vehicle further comprises a first solenoid valve and a hydraulic damping supercharging unit, said first solenoid valve and the hydraulic damping supercharging unit are connected with each other in parallel and then connected into the first oil discharge circuit and the second oil discharge circuit, the first damping sensor is connected electrically with the first solenoid valve.

The damping buffer control module in the articulated chassis system of large articulated vehicle further comprises a relief valve and a second solenoid valve, the relief valve and the second solenoid valve are connected with each other in parallel and then connected into the first oil discharge circuit and the second oil discharge circuit, and the relief valve and the second solenoid valve are located at the downstream position of the first solenoid valve and the hydraulic damping supercharging unit, the second damping sensor is connected electrically with the second solenoid valve.

A pressure sensor is arranged at the upstream position of the hydraulic damping supercharging unit in the first oil discharge circuit and the second oil discharge circuit in the articulated chassis system of large articulated vehicle.

A pressure measuring port is arranged in the first oil discharge circuit and/or the second oil discharge circuit of the hydraulic cylinder in the articulated chassis system of large articulated vehicle.

The thickness of the outer ring in the articulated chassis system of large articulated vehicle is less than the thickness of the inner ring.

Other features of the articulated chassis system of large articulated vehicle provided by the above-mentioned first aspect are also applicable to the articulated chassis system of large articulated vehicle provided by the second aspect.

The beneficial effects of the present invention are as follows:

1. The turning angle sensing means of the present invention can sense the turning angle; enhance the damping intelligently; alarm and lock hydraulically when the angle is too big; play a protective role to the articulated system, to prevent from occurring "shear" accidents; and the thickness of the outer ring of the turnplate bearing is less than the thickness of the inner ring so that the thickness of the entire articulated chassis system is reduced.

2. The rear frame of the present invention includes a bearing support portion and an annular projection, the annular projection is arranged on the upper side of the bearing support portion, the inner ring is mounted on the bearing support portion and surrounds the outer side of the annular projection, so that the structure is simple and compact, has a relatively low cost, is easy to process; has a strong resistance to torsion, a long service life; and a relatively high strength due to being casted integrally.

3. The structure of the present invention is simple and easy to maintain and install; has a high strength and a long service life.

4. The spherical hinge connecting structure of the present invention is simple in structure, easy to install and maintain; improves greatly the connection strength of the spherical hinge connecting structure, thus has a relatively high connection strength, and a long service life; can prevent effectively the metal core main shaft of the spherical hinge from moving left or right in the elastic member; and the arrangement of the buffer holes can play a buffering effect on the acting force.

5. The connection of the rear beam and the rear frame of the present invention has a strong rigidity and is easy to produce; the arrangement of the wire holes facilitates the installation of the wires, pipes and so on of the articulated system.

6. The hydraulic damping buffer system of the present invention is simple in pressure control, can produce a buffer resistance without electrical controlling or rotating a valve core, would basically not occur oil leakage, valve core deadlocking and electrical system failure, etc., significantly reducing the failure rate; at the same time, it can provide a hydraulic damping force proportional to the turning speed of the vehicle, at a big turning also can play the functions of locking and safety protection when the angle is too big; it has a low manufacturing cost, without the use of expensive hydraulic proportional valves or rotary valves with high precision in manufacturing and processing, greatly reducing the manufacturing cost and improving the competitiveness in the market; it has a simple structure, and has a good interchangeability, particularly in articulated buses, the left hydraulic cylinder and the right hydraulic cylinder are symmetrical mutually, other structures and components are same exactly; it is convenient to use and install, when it is assembled and refueled after the unique refueling process, it is very convenient to be installed on the articulated system, for it only needs to mount the oil cylinder to the machine rack, and does not need to install other components such as oil tubes, pipe joints and so on.

BRIEF DESCRIPTION OF THE DRAWINGS

FIG. 6b is a schematic sectional view of the hydraulic damping buffer device shown in FIG. 6a.

FIG. 8b is another schematic perspective view of the spherical hinge bracket structure shown in FIG. 8a.

DETAILED DESCRIPTION OF THE PREFERRED EMBODIMENT

In order to understand the technical content of the present invention clearly, the present invention is further exemplified by reference to the following examples. Wherein the same components adopt the same reference signs.

Figure 1:
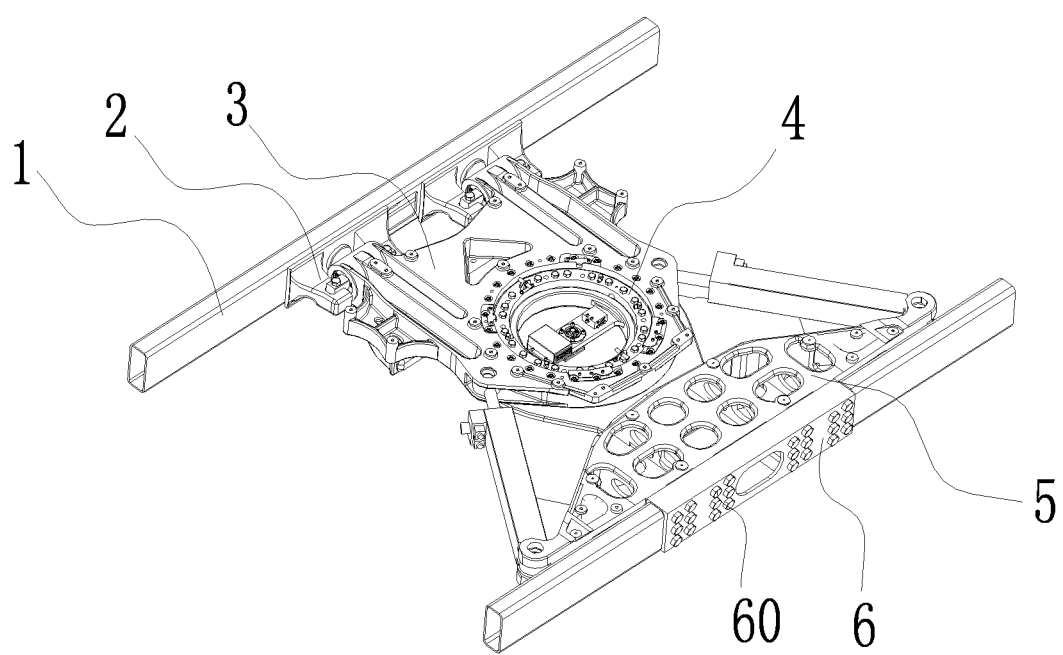
FIG. 1 is a schematic perspective view of an embodiment of the articulated chassis system of large articulated vehicle according to the present invention.

Please refer to FIG. 1, the articulated chassis system of large articulated vehicle of the present invention comprises a front beam 1, a spherical hinge connecting structure 2, a front frame 3, a turnplate bearing 4, a rear frame 5 and a rear beam 6, the front beam 1 is connected with the front frame 3 through the spherical hinge connecting structure 2, the turnplate bearing 4 comprises an inner ring 41 and an outer ring 42, the front frame 3 is connected fixedly with the outer ring 42, the rear frame 5 is connected fixedly with the inner ring 41, the inner ring 41 and the outer ring 42 can rotate relatively, the rear frame 5 is connected with the rear beam 6.

It should be pointed out that the connecting manners of the front frame 3 and the rear frame 5 of the present invention with the turnplate bearing 4 respectively also can adopt a manner that is symmetrical and has the same effects to the above-mentioned embodiment, i.e. the front frame is connected fixedly with the inner ring, the rear frame is connected fixedly with the outer ring, the subsequent corresponding coordination structures of the other components all can adopt the manners that are symmetrical to the present embodiment, all of these should belong to the transformations of the technical means that can be understood and implemented by the technicians skilled in the art without any creative labors, in order to save the length of the specification and make the specification concise, they would be not described repeatedly here.

The articulated chassis system of large articulated vehicle further comprises a turning angle sensing means, the turning angle sensing means is arranged between the inner ring 41/the outer ring 42 and the front frame 3/the rear frame 5. Please refer to FIG. 2 and FIG. 3, in an embodiment of the present invention, the turning angle sensing means comprises an angle sensor 7, a first angle sensor 6-1 and a second angle sensor 6-2, on the inner ring 41 are arranged a plurality of sensor mounting holes 416 (as shown in FIG. 4), the angle sensor 7 is mounted through the sensor mounting holes 416, the first angle sensor 6-1 and the second angle sensor 6-2 are arranged fixedly on the front frame 3, the first angle sensor 6-1 and the second angle sensor 6-2 are arranged at two sides of the angle sensor 7 respectively, the first angle sensor 6-1 and the second angle sensor 6-2 are connected electrically with a buzzer (not shown in the figures) respectively. The angle sensor is connected electrically with an alarm device 72. A buffer block 33 is further arranged on the front frame 3, a buffer end 71 is further arranged on the rear frame 5 symmetrically.

Figure 3:
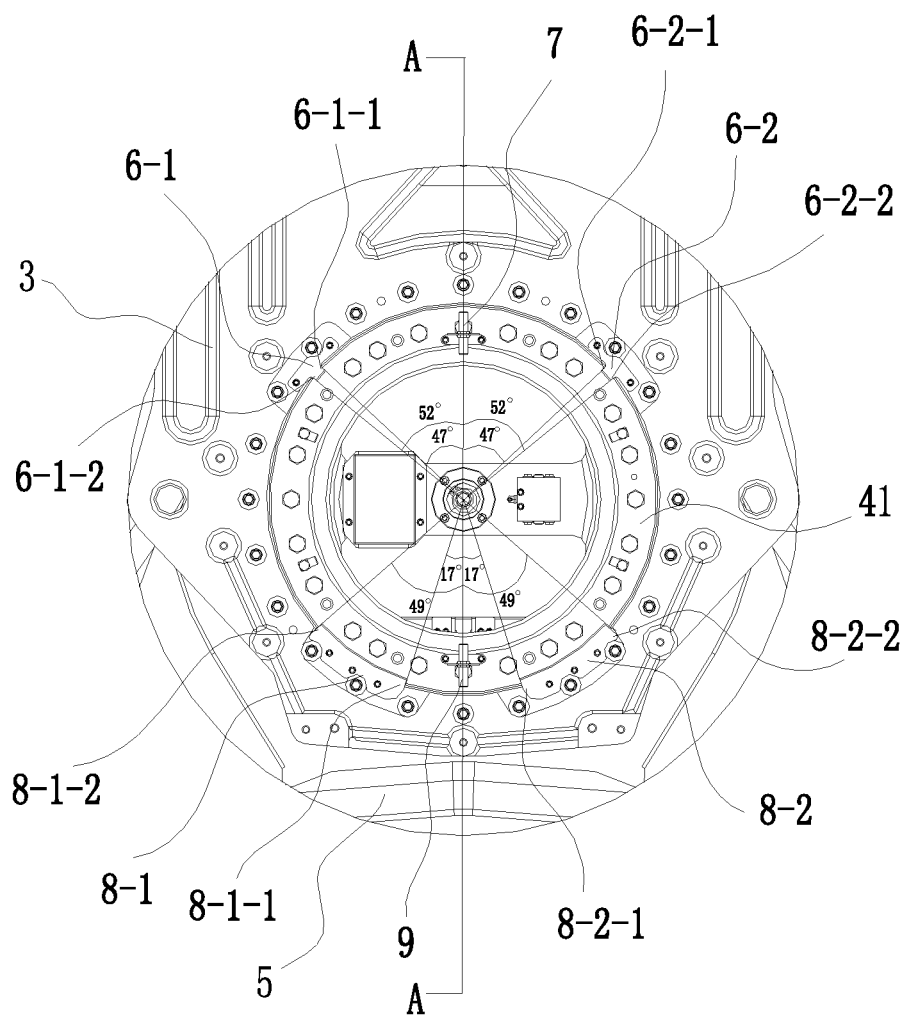
FIG. 3 is a partially enlarged schematic view of FIG. 2.
Figure 4:
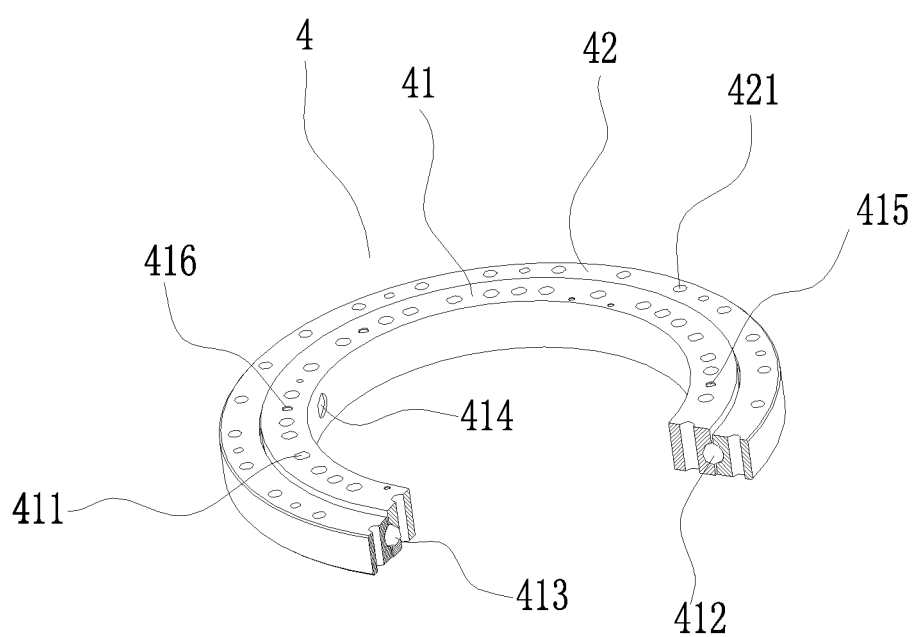
FIG. 4 is a schematic sectional perspective view of the turnplate bearing of the embodiment shown in FIG. 1

As shown in FIG. 3, in an preferred embodiment of the present invention, the first angle sensor 6-1 comprises a first alarm end 6-1-1 and a first mechanical locking end 6-1-2, the second angle sensor 6-2 comprises a second alarm end 6-2-1 and a second mechanical locking end 6-2-2, the first alarm end 6-1-1 and the second alarm end 6-2-1 form an angle of 40°~50° in the circumferential direction of the inner ring 41 with the angle sensor 7 respectively, the first mechanical locking end 6-1-2 and the second mechanical locking end 6-2-2 form an angle of 45°~55° in the circumferential direction of the inner ring 41 with the angle sensor 7 respectively.

In the present embodiment, preferably, the first alarm end 6-1-1 and the second alarm end 6-2-1 form an angle of 47° in the circumferential direction of the inner ring 41 with the angle sensor 7 respectively, the first mechanical locking end 6-1-2 and the second mechanical locking end 6-2-2 form an angle of 52° in the circumferential direction of the inner ring 41 with the angle sensor 7 respectively.

In the present preferred embodiment, the turning angle sensing means further comprises a first damping sensor 8-1, a second damping sensor 8-2 and a damping sensor 9, the first damping sensor 8-1 and the second damping sensor 8-2 are arranged fixedly on the front frame 3, the damping sensor 9 is arranged fixedly in the sensor mounting holes 416 of the inner ring 41, the angle sensor 7 and the damping sensor 9 are arranged on the A-A center line, bisecting the circumference that the inner ring 41 is located on, the first damping sensor 8-1 and the second damping sensor 8-2 are arranged at two sides of the damping sensor 9 respectively.

The first damping sensor 8-1 comprises a first damping end 8-1-1 and a first hydraulic locking end 8-1-2, the second damping sensor 8-2 comprises a second damping end 8-2-1 and a second hydraulic locking end 8-2-2, the first damping end 8-1-1 and the second damping end 8-2-1 form an angle of 15°~20° in the circumferential direction of the inner ring 41 with the damping sensor 9 respectively, the first hydraulic locking end 8-1-2 and the second hydraulic locking end 8-2-2 form an angle of 45°~55° in the circumferential direction of the inner ring 41 with the damping sensor 9 respectively.

In the present embodiment, preferably, the first damping end 8-1-1 and the second damping end 8-2-1 form an angle of 17° in the circumferential direction of the inner ring 41 with the damping sensor 9 respectively, the first hydraulic locking end 8-1-2 and the second hydraulic locking end 8-2-2 form an angle of 49° in the circumferential direction of the inner ring 41 with the damping sensor 9 respectively.

The present invention further comprises a hydraulic damping buffer system, and the hydraulic damping buffer system is arranged between the front frame 3 and the rear frame 5.

Please refer to FIG. 2, FIG. 5-FIG. 6c, the hydraulic damping buffer system includes two hydraulic damping buffer devices 100 arranged left and right symmetrically and a damping buffer control module, each of the hydraulic damping buffer devices 100 includes a piston 101, a piston rod 102 and a cylinder liner 103, the piston 101 is arranged in the cylinder liner 103, and one side of the piston 101 is connected fixedly with the piston rod 102, the piston rod 102 is connected fixedly with the front frame 3, the end of the cylinder liner 103 of each of the hydraulic damping buffer devices 100 is connected fixedly with the rear frame 5, the damping buffer control module is connected with the left damping buffer device 100 and the right damping buffer device 100.

In the embodiment of the present invention, the hydraulic damping buffer device 100 is a hydraulic cylinder, the hydraulic cylinder is divided by the piston 101 into a rod chamber 104 and a rodless chamber 105, the damping buffer control module includes a first one-way valve 106, a second one-way valve 107, a third one-way valve 108, a fourth one-way valve 109 and an oil reservoir 110, the rodless chamber 105 is sequentially connected with the third one-way valve 105 and the oil reservoir 110 in series to form a first oil suction circuit, the rod chamber 104 is sequentially connected with the fourth one-way valve 109 and the oil reservoir 110 in series to form a second oil suction circuit; the rodless chamber 105 is sequentially connected with the first one-way valve 106 and the oil reservoir 110 in series to form a first oil discharge circuit, the rod chamber 104 is sequentially connected with the second one-way valve 107 and the oil reservoir 110 in series to form a second oil discharge circuit; at least one hydraulic damping unit 111, 121 is connected in series in each of the first oil discharge circuit and the second oil discharge circuit. The hydraulic damping units 111, 121 perform the basic damping.

Preferably, the damping buffer control module comprises a rod chamber integrated block 112 and a rodless chamber integrated block 113 arranged independently, the first oil suction circuit and the first oil discharge circuit are arranged inside the rodless chamber integrated block 113, the second oil suction circuit and the second oil discharge circuit are arranged inside the rod chamber integrated block 112.

Preferably, the rod chamber integrated block 113 and the rodless chamber integrated block 112 are arranged at two ends of the cylinder liner 103 respectively, a housing 113 is arranged to surround the rod chamber integrated block 113, the cylinder liner 103 and the rodless chamber integrated block 114, and the oil reservoir 110 is a sealed space formed between the cylinder liner 103, the housing 114, the rodless chamber integrated block 113 and the rod chamber integrated block 112.

Preferably, the damping buffer control module further comprises a first solenoid valve 115 and a hydraulic damping supercharging unit 116, the first solenoid valve 115 and the hydraulic damping supercharging unit 116 are connected with each other in parallel and then connected into the first oil discharge circuit and the second oil discharge circuit, the first damping sensor 8-1 is connected electrically with the first solenoid valve 115. The hydraulic damping supercharging unit 116 plays the damping supercharging function, the three kinds of hydraulic damping with definite values mentioned above can play the resistance buffer role making the compression speed be proportional to the damping reaction.

Preferably, the damping buffer control module further comprises a relief valve 117 and a second solenoid valve 118, the relief valve 117 and the second solenoid valve 118 are connected with each other in parallel and then connected into the first oil discharge circuit and the second oil discharge circuit, and the relief valve 117 and the second solenoid valve 118 are located at the downstream position of the first solenoid valve 115 and the hydraulic damping supercharging unit 116, the second damping sensor 8-2 is connected electrically with the second solenoid valve 118. The relief valve 117 can be pre-set the pressure value, when the hydraulic oil pressure is greater than the set pressure value, the relief valve 117 will automatically open to release the pressure, to prevent the pressure in the hydraulic system from being excessive to cause leakage or bursting, and play the security protection role.

Preferably, a pressure sensor 119 is arranged at the upstream position of the hydraulic damping supercharging unit 116 in the first oil discharge circuit and the second oil discharge circuit. The pressure sensor 119 may be pre-set the pressure value, after the vehicle travels a certain time, if the pressure in the hydraulic cylinder is consistently lower than the set value of the pressure sensor 119, the alarm device connected signally with the pressure sensor 119 would send an alarm signal, indicating that the buffer failure, even the oil leakage of the hydraulic cylinder may occur, thus related components should be repaired timely to prevent the buffer failure from causing a traffic accident.

Preferably, a pressure measuring port 120 is arranged in the first oil discharge circuit and/or the second oil discharge circuit, the pressures of the first oil discharge circuit and the second oil discharge circuit can be measured during the product testing process, to ensure the best buffer effect.

Figure 5:
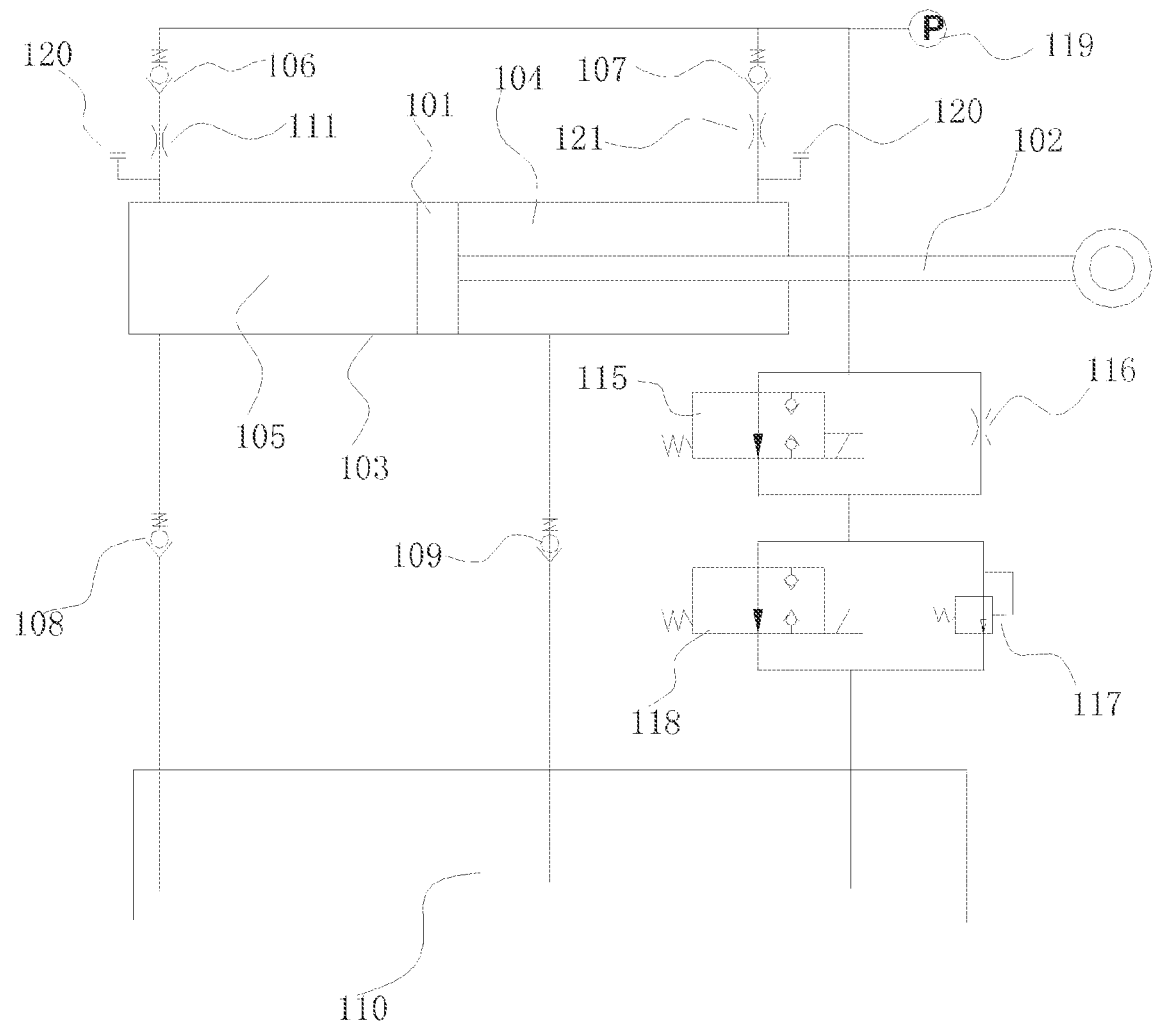
FIG. 5 is a schematic view of the oil circuit control principle of the hydraulic damping buffer device of the embodiment shown in FIG. 1.
Figure 6A:
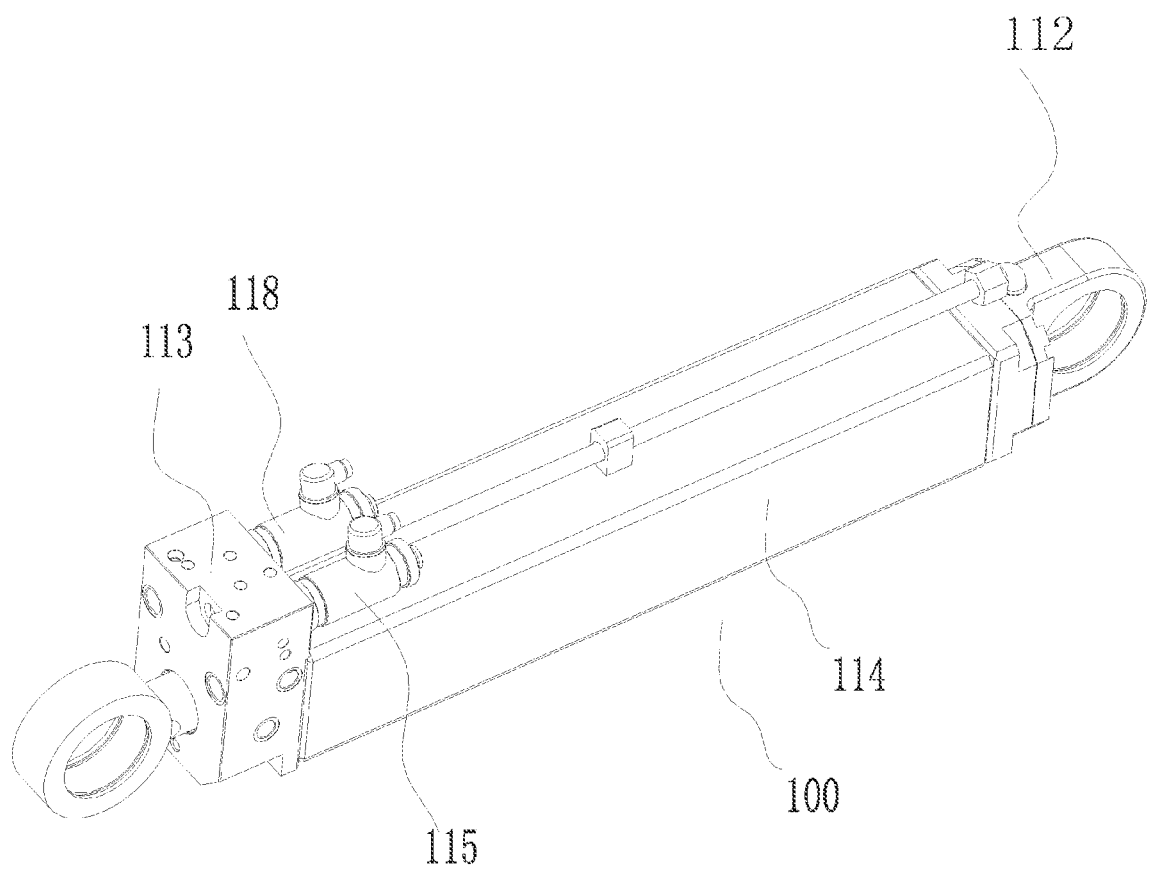
FIG. 6a is a schematic perspective view of the hydraulic damping buffer device of the embodiment shown in FIG. 1.
Figure 6B:
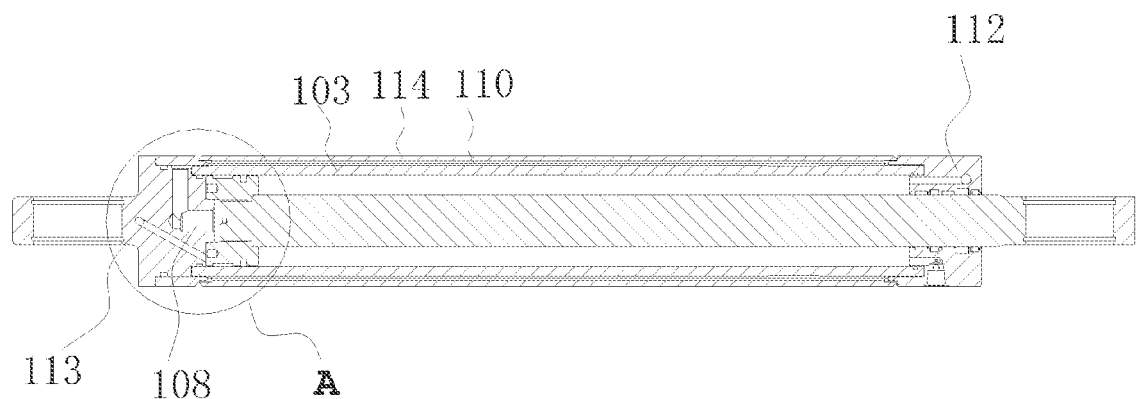
Figure 6C:
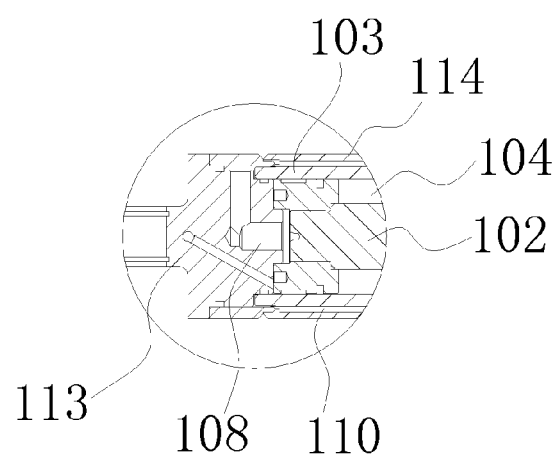
FIG. 6c is a schematic enlarged view of the area A in FIG. 6b.

As shown in FIG. 5, when the hydraulic cylinder is compressed by the compression force, the piston 101 moves to the rodless chamber 105, in the rodless chamber 105, the hydraulic oil is compressed, the pressure increases fastly or slowly according to the compression speed, when passing through the hydraulic damping unit 111, the hydraulic oil discharges more or less, the compression force received by the hydraulic cylinder is bigger, the compression is faster, the amount of oil to be discharged is more, the resistance generated by the hydraulic cylinder is greater, to play the basic damping role; after a pressure difference is generated when the hydraulic oil passes through the hydraulic damping unit 111, the hydraulic oil opens the first one-way valve 106, for the resistance of the hydraulic damping supercharging unit 116 is relatively large, the hydraulic oil would flow to the oil reservoir 110 through the first solenoid valve 115 and the second solenoid valve 118 after it passes through the first one-way valve 106, as the piston 101 moves left constantly to a certain position, a first proximity switch (not shown in the figures) connected electrically with the first solenoid valve 115 controls the first solenoid valve 115 to close, the hydraulic oil would flow to the oil reservoir 110 through the hydraulic damping supercharging unit 116 and the second solenoid valve 118, when the hydraulic oil passes through the hydraulic damping supercharging unit 116, the oil pressure within the rodless chamber 105 and the first discharge oil circuit is increased again, the damping within the hydraulic cylinder continues to increase, to improve the buffer effect.

When the piston 101 continues to move left, the present invention will give a signal of angle-exceeding, a second proximity switch (not shown in the figures) connected electrically with the second solenoid valve 118 controls the second solenoid valve 118 to close, the hydraulic oil can only flow to the relief valve 117 after passing through the hydraulic damping supercharging unit 116, as the pressure within the rodless chamber 105 and the first discharge oil circuit increases, when the oil pressure reaches a pre-set pressure value of the relief valve 117, the relief valve 117 opens automatically to release the pressure, when the pressure is reduced to the preset pressure value, the relief valve 117 closes automatically, At this time, due to the pressure difference, the piston 101 is prevented from continuing to move left, and can return to its original position by moving right, thus the locking function and the security protection function can be completed.

During the oil discharging process of the first oil discharge circuit, as the volume of the rod chamber 104 increases, the oil in the oil reservoir 110 will be added into the rod chamber 104 through the fourth one-way valve 109, ensuring that the oil in the rod chamber 104 is in the full state, thus the oil suction process of the second oil suction circuit is completed.

When the hydraulic cylinder is under tension, i.e., the piston 101 moves to the rod chamber 104, in the rod chamber 104, the hydraulic oil is subject to the compression force, the pressure is gradually increased, as the pressure increases, the hydraulic oil discharged also increases, enhancing the damping, to complete the basic damping role; when the hydraulic oil passes through the hydraulic damping unit 121, a pressure difference is generated, the hydraulic oil opens the second one-way valve 107, since the first solenoid valve 115 is in the open state, the hydraulic oil would flow to the oil reservoir 110 through the first solenoid valve 115 and the second solenoid valve 118 after it passes through the second one-way valve 107, as the piston 101 moves right constantly to a certain position, a first proximity switch (not shown in the figures) controls the first solenoid valve 115 to close, the hydraulic oil would flow to the oil reservoir 110 through the hydraulic damping supercharging unit 116 and the second solenoid valve 118, when the hydraulic oil passes through the hydraulic damping supercharging unit 116, the oil pressure within the rod chamber 104 and the second discharge oil circuit is increased again, the damping within the hydraulic cylinder continues to increase, to improve the buffer effect.

When the piston 101 continues to move right, the present invention will give a signal of angle-exceeding, the second proximity switch controls the second solenoid valve 118 to close, the hydraulic oil flows to the relief valve 117 after passing through the hydraulic damping supercharging unit 116, as the pressure within the rod chamber 104 and the second discharge oil circuit increases, when the oil pressure reaches a pre-set pressure value of the relief valve 117, the relief valve 117 opens automatically to release the pressure, when the pressure is reduced to the preset pressure value, the relief valve 117 closes automatically, At this time, due to the pressure difference, the piston 101 is prevented from continuing to move right, and can return to its original position by moving left, thus the locking function and the security protection function can be completed.

During the oil discharging process of the second oil discharge circuit, as the volume of the rodless chamber 105 increases, the oil in the oil reservoir 110 and the high pressure oil will be added into the rodless chamber 105 through the third one-way valve 108, ensuring that the oil in the rodless chamber 105 is in the full state, thus the oil suction process of the first oil suction circuit is completed.

In practice, the positions of the first proximity switch and the second proximity switch can be arranged at suitable positions according to the requirements, in the present embodiment, the first proximity switch and the second proximity switch are arranged at the joint of the front frame assembly and the rear frame assembly, controlled by the electrical control system outside of the present hydraulic damping buffer system, when the piston 101 is located in the middle position and does not trigger the proximity switches, the first solenoid valve 115 and the second solenoid valve 118 are in the open state, when the vehicle turns left or right at a certain angle, the proximity switches would control the corresponding solenoid valve to close or open.

For the hydraulic damping buffer system of the present invention includes two hydraulic damping buffer devices 100, i.e. the hydraulic cylinders, arranged left and right symmetrically, when the vehicle turns, there must be one hydraulic cylinder under tension, and the other hydraulic cylinder compressed. When the articulated vehicle runs straightly, the pistons 101 of the left hydraulic cylinder and the right hydraulic cylinder are in the middle positions, the rod chambers 104 and the rodless chambers 105 of two hydraulic cylinders are filled with the hydraulic oil. When the vehicle runs straightly or turns left or right within 17°, two sensors would not give a sensing signal, when the vehicle turns right to reach 17°, the damping sensor 9 senses the sensing signal given by the second damping end 8-2-1 on the second damping sensor 8-2, and transfers the signal to the proximity switch controlling the right hydraulic cylinder of the hydraulic damping buffer system of the present invention, to close or open the corresponding solenoid valve, to begin to enhance the damping, so as to form the damping buffer to the continuous right turning of the vehicle, and the damping force increases as the right turning angle increases.

When the vehicle continues to turn right to reach 47°, the angle sensor 7 is close to the first alarm end 6-1-1 on the first angle sensor 6-1, and gives an alarm signal, the alarm signal is transferred to the buzzer to start alarm, prompting that the vehicle is close to the over articulated state, and informing to recover the straight run.

When the vehicle continues to turn right to reach 49°, the damping sensor 9 is close to the second hydraulic locking end 8-2-2 on the second damping sensor 8-2, and gives a sensing signal, the proximity switch controlling the right hydraulic cylinder of the hydraulic damping buffer system receives the sensing signal, it will open or close the corresponding solenoid valve, to complete the hydraulic locking operation.

When the vehicle continues to turn right to reach 52°, the angle sensor 7 is close to the first mechanical locking end 6-1-2 on the first angle sensor 6-1, at this time, the buffer block 33 on the front frame 3 of the articulated system contacts the buffer end 71 on the rear frame 5, the buffer end 71 prevents the front frame 3 from continuing to turn right, to complete the mechanical locking, the vehicle can not continue to expand the right turning angle, thus the mechanical locking action is completed.

Similarly, when the vehicle turns left and the angle is expanded continuously, the sensing signals are: an enhanced damping signal that would be given by the first damping sensor 8-1, an alarm signal that would be given by the second angle sensor 6-2, a hydraulic locking signal that would be given by the first damping sensor 8-1, when the turning angle is expanded to 52°, the left buffer blocks 33 on the front frame 3 and the left buffer end 71 on the rear frame 5 complete the mechanical locking action, to prevent the vehicle from turning too big to result in "shear" accidents.

Another embodiment of the present invention is substantially similar to the mechanism of the above-mentioned preferred embodiment, the difference is that the present embodiment does not need the damping sensor 9, the first damper sensor 8-1 and the second damping sensor 8-2, the angle sensor 7 is connected directly and electrically with the solenoid valves in the hydraulic damping buffer system, when the vehicle turns left or right more than 47°, the over articulated alarm signal and the hydraulic locking action are given directly, to improve the hydraulic damping, when the turning angle reaches 52°, the mechanical locking action is completed with the buffer blocks 33 on the front frame 3 and the buffer ends 71 on the rear frame 5, although this structure can not achieve the effect of enhancing the damping intelligently, but can save costs, and can also substantially achieve the effects of sensing the turning angle, alarming and locking when the turning angle is too big.

Please refer to FIG. 4, a plurality of inner ring mounting holes 411 are arranged separately in the circumferential direction on the inner ring 41, a plurality of outer ring mounting holes 421 are arranged separately in the circumferential direction on the outer ring 421, the thickness of the outer ring 42 is less than the thickness of the inner ring 41, thus the thickness difference of the outer ring 42 and the inner ring 41 forms a stepped portion.

Preferably, the circumference where the inner ring mounting holes 411 are located and the circumference where the outer ring mounting holes 421 are located are arranged concentrically.

A steel ball raceway 412 is formed in the circumferential direction at the joint of the inner ring 41 and the outer ring 42, and filled with steel balls 413 inside, the relative rotation of the inner ring 41 and the outer ring 42 is achieved through the steel balls 413.

Preferably, at least one steel ball inlet 414 is arranged on the inner wall of the inner ring 41, and used to mount the steel balls 413.

Preferably, at least one lubrication port 415 is arranged on the inner ring 41, the lubrication port 415 is communicated with the steel balls 413 inside the steel ball raceway 412, a lubricant can be added through the lubrication port 415 to lubricate the steel balls 413 inside the steel ball raceway 412, so as to achieve the lubrication role. In the present embodiment, four lubrication ports 415 are arranged separately and evenly on the inner ring 41

Figure 7:
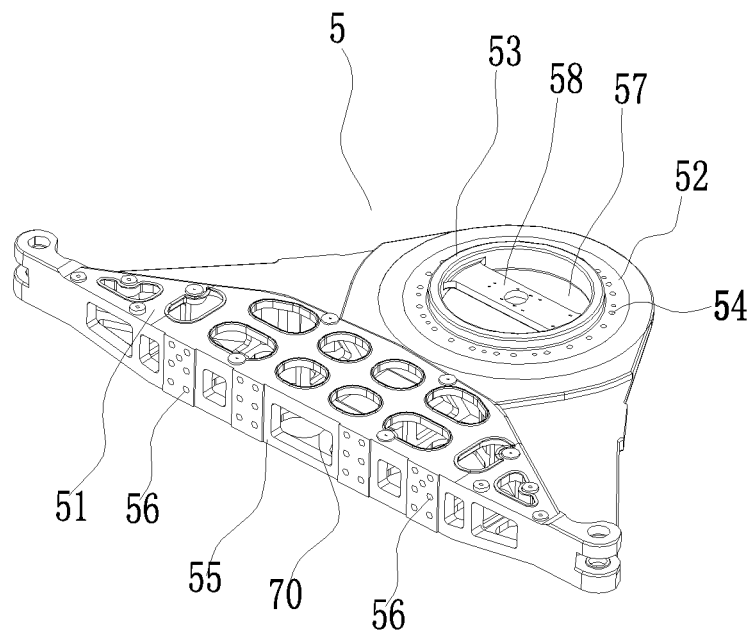
FIG. 7 is a schematic perspective view of the rear frame of the embodiment shown in FIG. 1.

As shown in FIG. 7, the rear frame 5 includes a rear frame connecting portion 51, a bearing support portion 52 and an annular projection 53, the bearing support portion 52 is arranged at the front side of the rear frame connecting portion 51, the annular projection 53 is arranged on the upper side of the bearing support portion 52, a plurality of rear frame mounting holes 54 are further arranged on the bearing support portion 52, the rear frame mounting holes 54 are arranged separately and evenly on the same circumference, and the circumference where the rear frame mounting holes 54 are located and the annular projection 53 are arranged concentrically.

A plurality of rear frame threaded holes 56 are arranged on the rear wall 55 of the rear frame connecting portion 51, the rear frame threaded holes 56 are used to be fixed to the rear beam 6, so as to be connected with the rear compartment of the articulated vehicle.

Preferably, a through hole 57 is formed at the middle position of the bearing support portion 52 of the rear frame 5, the circumference of the through hole 57 is formed by the inner diameter of the annular projection 53. More preferably, a fixing seat 58 is formed on the inner wall of the through hole 57, and used to mount the turnplate bearing lubrication system and the control device outside of the present invention. In the present embodiment, the rear frame 5 is formed integrally by casting, has a relatively high rigidity and is processed conveniently.

Figure 8A:
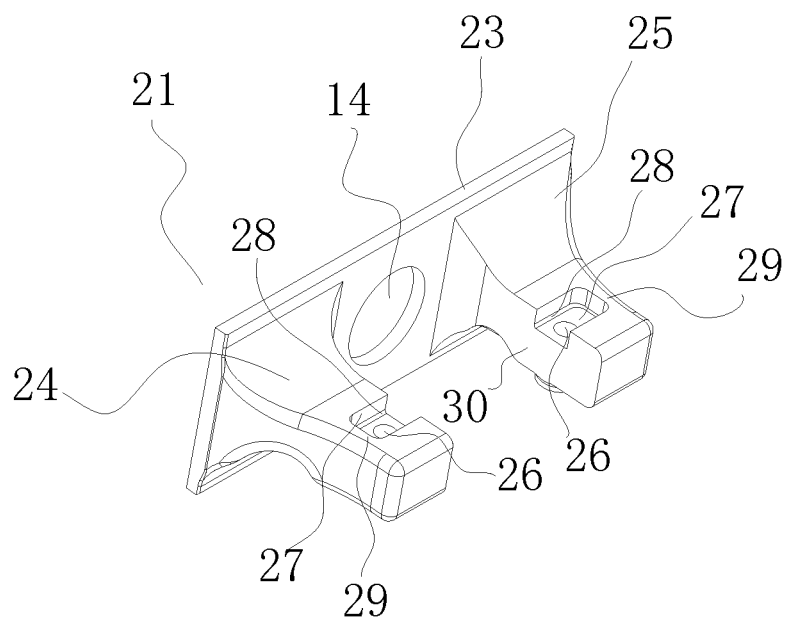
FIG. 8a is a schematic perspective view of the spherical hinge bracket structure of the spherical hinge connecting structure of the embodiment shown in FIG. 1.
Figure 8B:
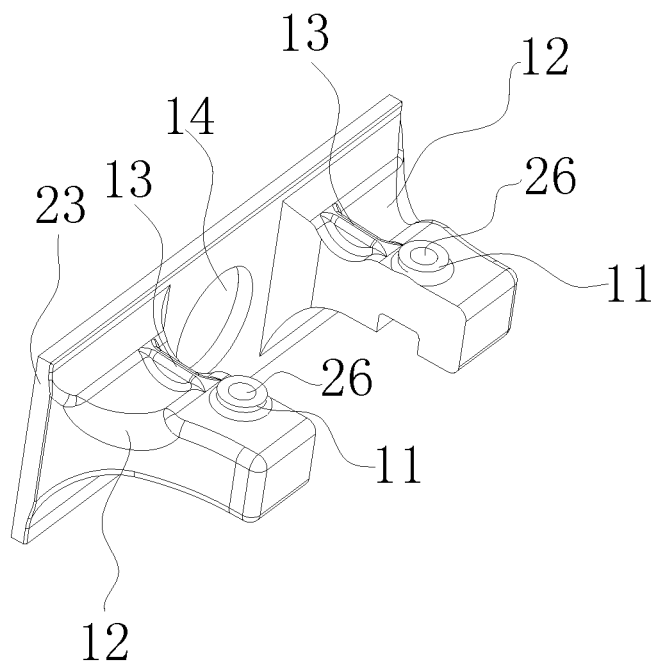
Figure 9:
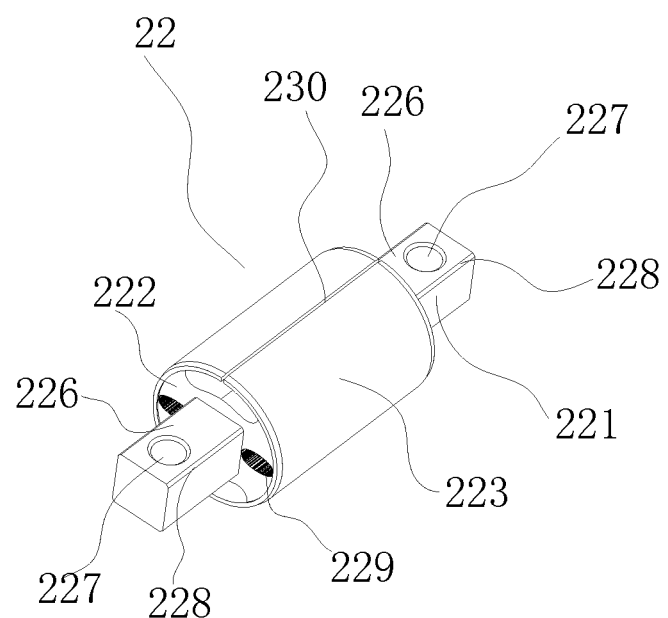
FIG. 9 is a schematic perspective view of the spherical hinge of the spherical hinge connecting structure of the embodiment shown in FIG. 1.
Figure 10:
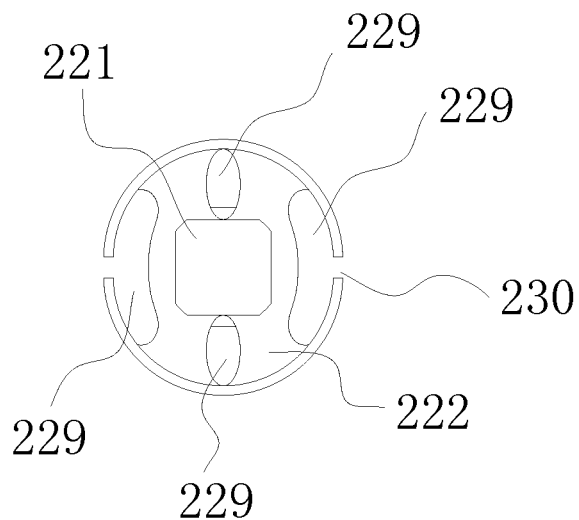
FIG. 10 is a schematic front view of the spherical hinge of FIG. 9.
Figure 11:
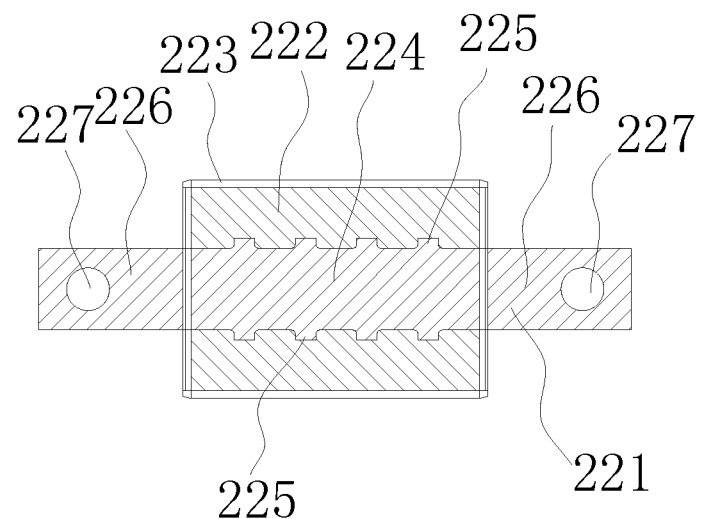
FIG. 11 is a schematic sectional view of the spherical hinge of FIG. 9.

The spherical hinge connecting structure 2 comprises a spherical hinge bracket structure 21 and a spherical hinge 22, please refer to FIG. 8a-8b, the spherical hinge bracket structure 21 includes a bracket fixing plate 23, a first fixing seat 24 and a second fixing seat 25, the first fixing seat 24 and the second fixing seat 25 are arranged at the same side of the bracket fixing plate 23, a threaded hole 26 is arranged on each of the first fixing seat 24 and the second fixing seat 25, and grooves 27 are arranged symmetrically on the first fixing seat 24 and the second fixing seat 25, one end of the threaded hole 26 is arranged in the groove 27, and the threaded holes 26 are arranged vertically in the first fixing seat 24 and the second fixing seat 25 respectively.

Preferably, the corners 28 of the groove 27 are round angle structures.

Preferably, the width of the groove 27 in the horizontal direction is less than the width of the first fixing seat 24 or the second fixing seat 25 in the horizontal direction, a horizontal reinforcing portion 29 is formed on each of the first fixing seat 24 and the second fixing seat 25. The depth of the groove 27 in the vertical direction is less than the thickness of the first fixing seat 24 or the second fixing seat 25 in the vertical direction, a vertical reinforcing portion 30 is formed on each of the first fixing seat 24 and the second fixing seat 25. The threaded hole 26 penetrates through the vertical reinforcing portion 30. In the present embodiment, the thickness of the vertical reinforcing portion 30 is at least twice as much as the depth of the groove 27. More preferably, a second projection 11 is arranged at the other side opposite to the groove 27 of each of the first fixing seat 24 and the second fixing seat 25, the other end of the threaded hole 26 is arranged in the second projection 11.

Because the spherical hinge bracket structure 21 in the articulated chassis system of large articulated vehicle of the present invention is subject to tension and compression constantly during the running of the vehicle, in order to improve the stress resistance, an arc stress portion 12 is formed on each of the first fixing seat 24 and the second fixing seat 25, at the other side of the groove 27 (the same side of the second projection 11), and near the bracket fixing plate 23. More preferably, a reinforcing rib 23 is arranged on the arc stress portion 12. The reinforcing rib 23 is connected with two ends of the arc stress portion 12, to further improve the stress resistance.

Preferably, a fixed hole 14 is arranged on the bracket fixing plate 23, the fixing hole 14 is located between the first fixing seat 24 and the second fixing seat 25.

Preferably, the spherical hinge bracket structure 21 is formed integrally by casting. That is to say, the bracket fixing plate 23, the first fixing seat 24, the second fixing seat 25, the second projection 11 and other components of it are formed integrally by casting, so as to improve the connection strength.

Please refer to FIG. 9-12, the spherical hinge 22 comprises a metal core 221, an elastic member 222 and a support sheet 223, the metal core 221 comprises a metal core main shaft 224 and at least one position-limiting projection 225 arranged on the outer surface of the metal core main shaft 224, the elastic member 222 is casted at the middle position of the outer surface of the metal core 221, the support sheet 223 is arranged outside of the elastic member 222, and used to surround the elastic member 222, the arrangement of the position-limiting projection 225 can prevent the metal core 221 from moving left or right in the elastic member 222.

Two ends of the metal core main shaft 224 are supporting portions 226, each of the two supporting portions 226 is provided with a spherical hinge fixing hole 227 used to fix the spherical hinge 22, the corners 228 of the supporting portions 226 are arranged as round angle structures.

A plurality of buffer holes 229 are arranged in the elastic member 222. In the embodiment, the elastic member 222 is a seismic wear-resistant rubber material, a buffer hole 229 is formed at each of the top, bottom, right and left parts in the elastic member 222, when the external force is relatively large, the buffer holes 229 can play the buffering effect on the acting force, so as not to damage the spherical hinge, and also play a protective role to other joints in the entire articulated system.

The support sheet 223 is composed of two arc metal sheets that form two slots 230 at the joints, to prevent from stress deformation under a great acting force.

Preferably, the metal core main shaft 224 and the position-limiting projection 225 on the outer surface of the metal core main shaft 224 are formed integrally, to form the metal core 221, the rigidity of which is relatively strong.

Figure 12:
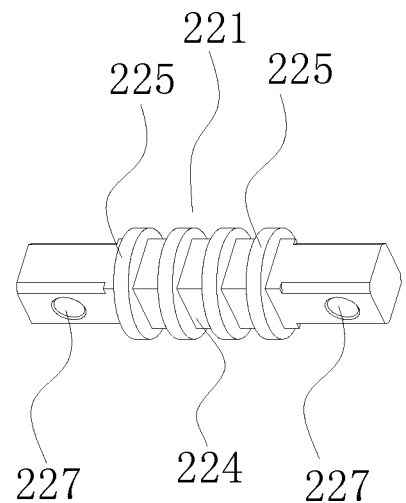
FIG. 12 is a schematic perspective view of the metal core of the spherical hinge of FIG. 9.

FIG. 12 is a perspective view of the metal core 221 of an embodiment of the present invention, the metal core main shaft 224 in the figure is a square cylinder structure, and the position-limiting projections 225 are arranged on the outer surface of the metal core main shaft 224. The position-limiting projections 225 are circular ring structures integrally around the outer surface of the metal core main shaft 224, in the present embodiment, four position-limiting projections 225 are arranged separately and evenly.

Figure 13:
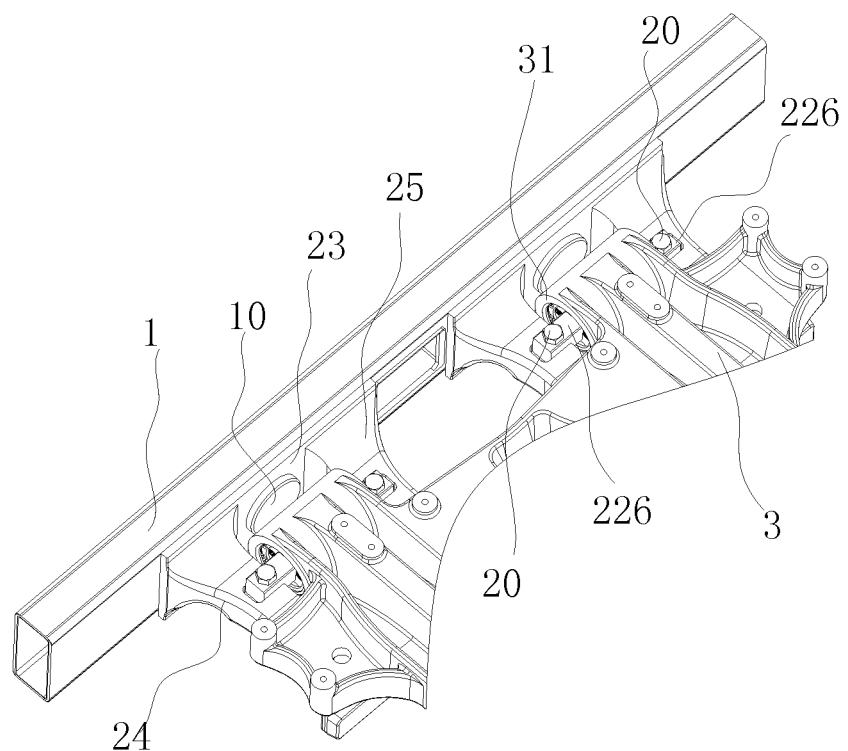
FIG. 13 is a schematic partial perspective view of the embodiment shown in FIG. 1.

As shown in FIG. 13, the articulated chassis system of large articulated vehicle generally comprises two spherical hinge bracket structures 21, each of which is welded on the front beam 1 through the bracket fixing plate 23, in order to improve the connection strength, the connection of the front beam 1 and the bracket fixing plate 23 is strengthened through the bolt 10, i.e. the bolt 10 passes through the fixing hole 14 to perform the further fixation, the front beam 1 is connected fixedly with the front compartment (not shown in the figures). Correspondingly, two spherical hinge mounting holes 31 are arranged on the front frame 3, one spherical hinge 22 is arranged in each of the spherical hinge mounting holes 31, the support sheet 223 on the outer surface of the spherical hinge 22 is a metal element, to prevent the elastic member 222 from contacting directly the spherical hinge mounting hole 31, the supporting portions 226 at two sides of each spherical hinge are fixed in the grooves 27 on the first fixing seat 24 and the second fixing seat 25 by penetrating the bolts through the spherical hinge fixing holes 227 and the threaded holes 26, for the corners 228 of the supporting portions 226 at two ends of the metal core main shaft 224 are round angle structures, and the round angles are larger than those of the corners 28 of the grooves 27, thus when the vehicle runs, the spherical hinge bracket structure 21 is prevented from concentrating stress to damage the spherical hinge fixing seat, therefore the round angle structures improve the connection strength between the spherical hinge 22 and the spherical hinge bracket structure 21. When the vehicle turns left or right, the spherical hinge 22 would not move right or left under the role of the position-limiting projections 225; when the vehicle goes ahead, brakes suddenly or bumps up and down, it would generate a relatively large acting force to the spherical hinge 22, the arrangement of the buffer holes 229 can have the buffer effect, and play a protective role to the articulated system.

Figure 14:
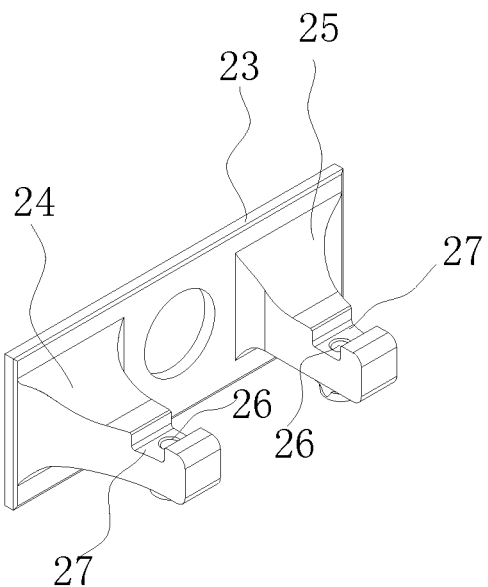
FIG. 14 is a schematic perspective view of another embodiment of the spherical hinge bracket structure of the present invention.

FIG. 14 is a perspective view of another embodiment of the spherical hinge bracket structure 21 in the articulated chassis system of large articulated vehicle of the present invention, the width of the groove 27 in the horizontal direction is equal to the width of the first fixing seat 24 or the second fixing seat 25 in the horizontal direction, i.e. the groove 27 is a through groove, the other structures are same to those of the above-mentioned embodiment, their installation manners are not repeated again, and the effects substantially consistent to those of the above-mentioned embodiment can be achieved.

The metal core main shaft 224 of another embodiment of the metal core 221 of the present invention is a square cylinder structure, and the position-limiting projections 225 are arranged integrally on the outer surface of the metal core main shaft 224. The position-limiting projections 225 are square ring structures integrally around the outer surface of the metal core main shaft 224, for example, four position-limiting projections 225 are arranged separately and evenly.

The middle part of the metal core main shaft 224 of another embodiment of the metal core 221 of the present invention is a round cylinder structure, two end parts of the metal core main shaft 224 are square cylinder structures, the position-limiting projections 225 are arranged on the outer surface of the round cylinder structure. The position-limiting projections 225 are square ring structures, for example, four position-limiting projections 225 are arranged separately and evenly.

In other embodiments, the support sheet 223 also can be arranged to be composed of more than two arc metal sheets, to form more than two slots 230, all structures can achieve the effect of preventing from stress deformation.

In other embodiments, the number of the position-limiting projections 225 can be determined according to the size of the acting force and the rigidity requirement, the structure of the position-limiting projections 225 may be regular shapes, or may be irregular shapes, and can be determined according to the requirements, the positions can be determined regularly, also can be determined irregularly, as long as preventing the metal core 221 from rotating or moving left or right in the elastic member 222 can be achieved.

Figure 2:
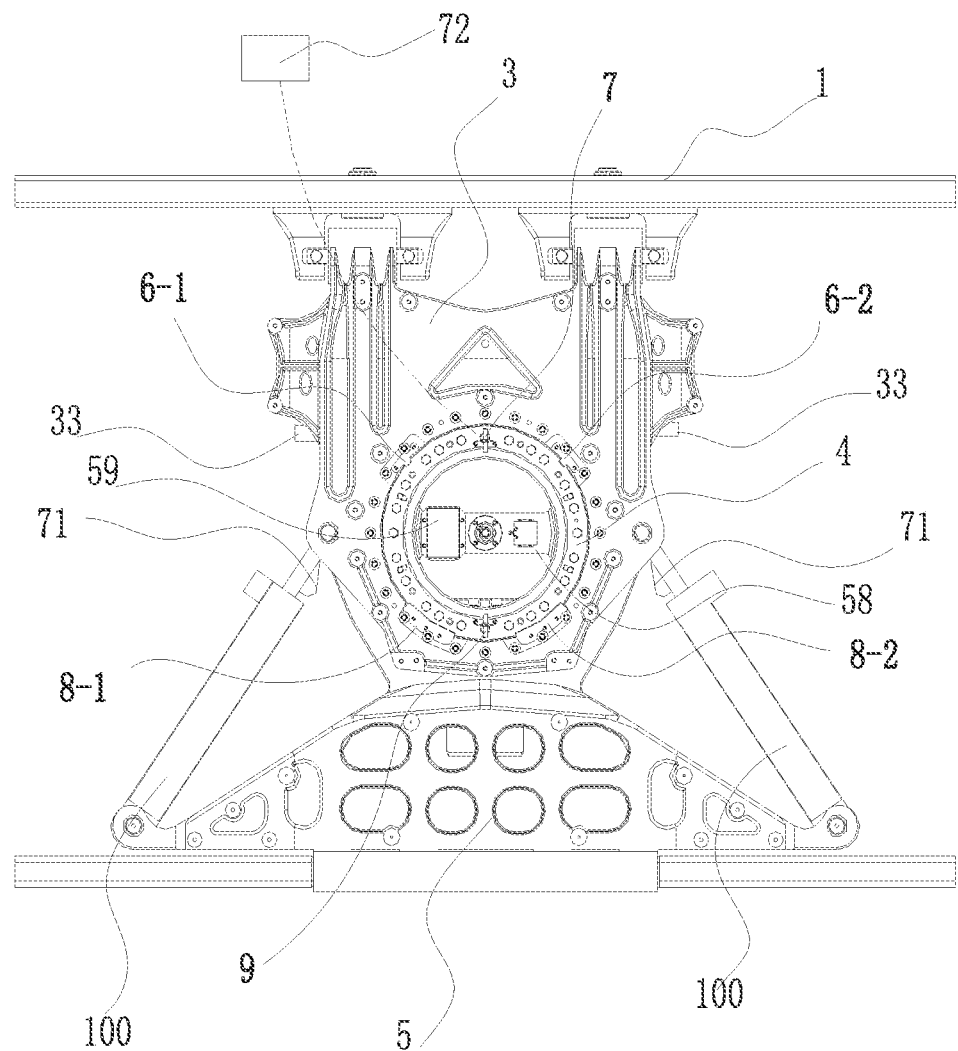
FIG. 2 is a schematic plan view of the embodiment shown in FIG. 1.
Figure 15:
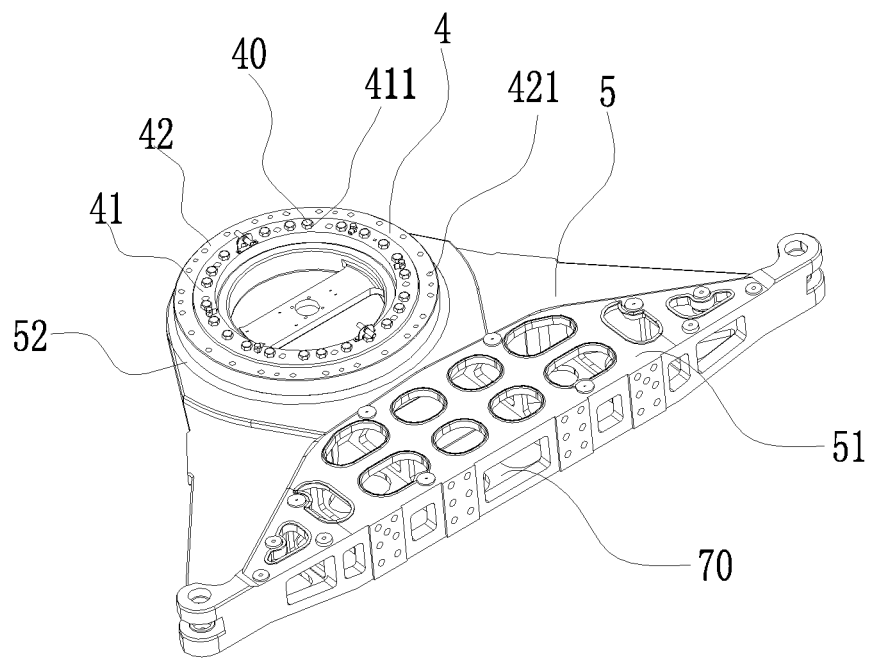
FIG. 15 is a schematic perspective view of the installation of the rear frame and the turnplate bearing shown in FIG. 1.

Please FIGS. 2 and 15, FIG. 15 is a perspective view of the installation of the rear frame 5 and the turnplate bearing 4, the turnplate bearing 4 is mounted outside of the circumference of the annular projection 53 on the rear frame 5, the inner diameter of the inner ring 41 is equal to the outer diameter of the annular projection 53. The inner ring mounting holes 411 correspond to the rear frame mounting holes 54 on the bearing support portion 52 of the rear frame 5 one by one, the inner ring 41 and the rear frame 5 are fixed by bolts 40, on the fixing seat 58 of the rear frame 5 is arranged fixedly a concentrated lubrication device 59, which is communicated with the lubrication port 415 through a pipe (not shown), so as to play the lubrication role to the steel balls 413 inside the steel ball raceway 412, to improve their rotation effects, and prolong their service lives. The front frame 3 and the outer ring 42 are arranged fixedly on the stepped portion formed by the inner ring 41 and the outer ring 42 by penetrating bolts (not shown) through the outer ring mounting holes 421 and the front frame mounting holes 32, the front frame 3 is further connected with the front compartment (not shown) through the front beam 1. For the thickness of the outer ring 42 is less than the thickness of the inner ring 41, the thickness of the whole articulated system is reduced.

In the present embodiment, the bolts fixing the front frame 3 and the outer ring 42 is treated with "precote", and is not removable, has a high connection strength and a relatively strong stability.

When the articulated vehicle is running, the outer ring 42 of the turnplate bearing 4 will rotate as the front compartment and the front frame 3 turn, because the annular projection 53 and the inner ring 41 are contacted directly at the circumferences, the rotational torque force formed when the vehicle turns would not only act on the bolts 40, the annular projection 53 provides a stronger torsional property, thus improves the anti-torsion force of the turnplate bearing 4 greatly.

Figure 16:
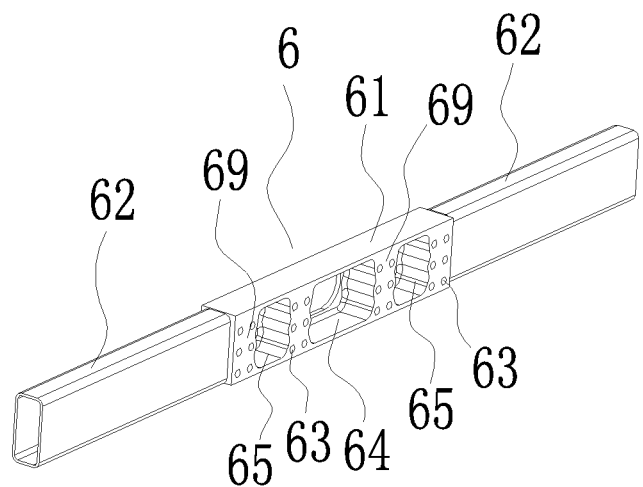
FIG. 16 is a first schematic perspective view of the rear beam of the embodiment shown in FIG. 1.
Figure 17:
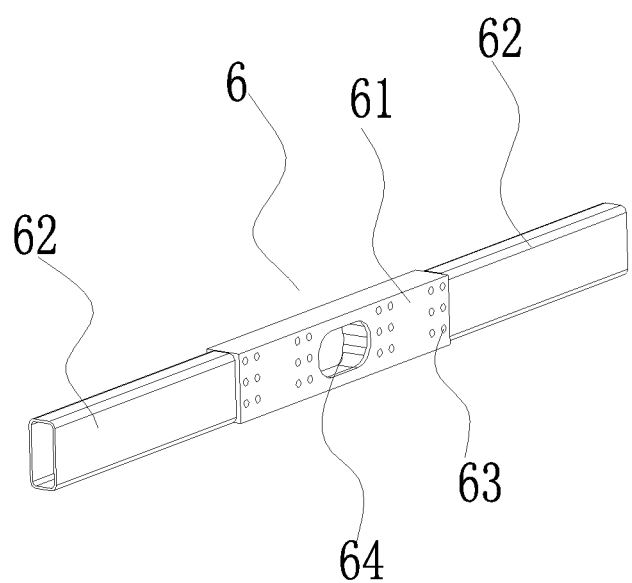
FIG. 17 is a second schematic perspective view of the rear beam shown in FIG. 16.
Figure 18:
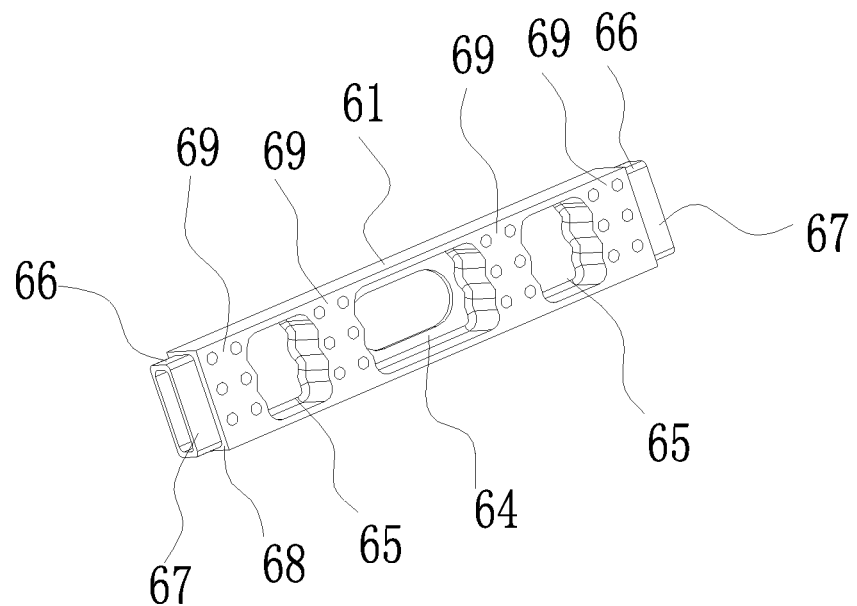
FIG. 18 is a schematic perspective view of the reinforcing portion of the rear beam shown in FIG. 16.

The rear frame 5 and the rear beam 6 are connected by bolts 60, the rear beam 6 and the rear compartment (not shown) are connected by welding, please refer to FIG. 16 to 18, the rear beam 6 comprises a reinforcing portion 61 and connecting portions 62 welded to two ends of the reinforcing portion 61, a plurality of fixing threaded holes 63 are arranged in the reinforcing portion 61, a wire hole 64 is arranged in the reinforcing portion 61, a plurality of lightening holes 65 are arranged symmetrically on two sides of the wire hole 64, the reinforcing portion 61 is formed by casting, the wire hole 64 is used for passing through the wires of the articulated system, the lightening holes 65 are blind hole structures, and can maximally reduce the weight of the rear beam 6 without affecting the rigidity of the reinforcing portion 61.

Preferably, as shown in FIG. 18, the reinforcing portion 61 comprises two mounting portions 66, the two mounting portions 66 are located at two ends of the reinforcing portion 61 respectively, each of the mounting portions 66 includes a first step surface 67 and a second step surface 68, the connecting portion 62 is a stamping part with hollow cylinder structure, the left and right connecting portions 62 are surrounded the outside of the first step surfaces 67 of the two mounting portions 66 respectively, and connected with the second step surfaces 68 by welding.

FIG. 16-18 is a preferred embodiment of the rear beam 6 of the present invention, a wire hole 64 is arranged at the central position of the reinforcing portion 61, one lightening hole 65 is arranged at each of two sides of the wire hole 64, the reinforcing portion 61 forms four reinforcing connecting portions 69, six fixing threaded holes 63 are arranged on each of the reinforcing connecting portions 69.

Figure 19:
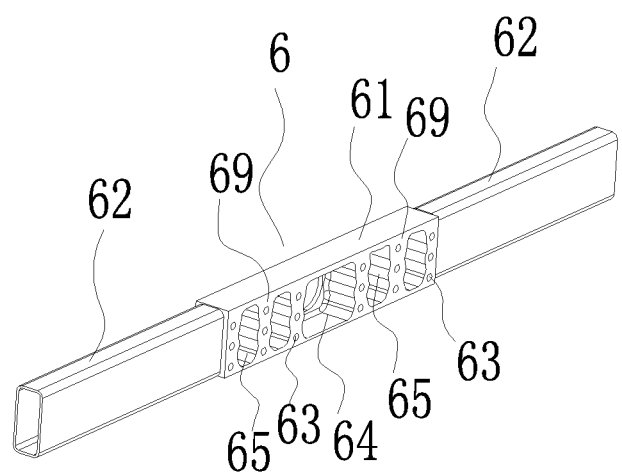
FIG. 19 is a schematic perspective view of another embodiment of the rear beam of the present invention.

FIG. 19 is a perspective view of another embodiment of the rear beam 6 of the present invention, a wire hole 64 is arranged at the central position of the reinforcing portion 61, two lightening holes 65 are arranged at each of two sides of the wire hole 64, the reinforcing portion 61 forms six reinforcing connecting portions 69, three fixing threaded holes 63 are arranged on each of the reinforcing connecting portions 69.

As shown in FIGS. 1, 7 and 15, the rear frame 5 is connected with the rear beam 6 by penetrating the bolts 60 through the rear frame threaded holes 56 formed on the rear wall 55 of the rear frame connecting portion 51 and the fixing threaded holes 63 on the rear beam 6, the number of the rear frame threaded holes 56 can be determined according to the number of the fixing threaded holes 63 in the above-mentioned embodiment, corresponding to the wire hole 64 on the rear beam 6, a rear frame wire hole 70 is arranged on the rear frame connecting portion 51, to facilitate the installation of the wires, so that the wires would not affect the proper work of the articulated system.

In an embodiment, the front and rear surfaces of the rear beam 6 can be used as the connecting contact surfaces of the rear frame 5 and the rear member 6, FIG. 1 shows the surface with the lightening holes 65 on the rear beam 56 used as the contact surface.

With the articulated chassis system of large articulated vehicle of the present invention, it has the following obvious technical features:

(1) The turning angle sensing means can sense the turning angle; enhance the damping intelligently; alarm and lock hydraulically when the angle is too big; play a protective role to the articulated system, to prevent from occurring "shear" accidents; and the thickness of the outer ring of the turnplate bearing is less than the thickness of the inner ring so that the thickness of the entire articulated chassis system is reduced.

(2) The rear frame includes a bearing support portion and an annular projection, the annular projection is arranged on the upper side of the bearing support portion, the inner ring is mounted on the bearing support portion and surrounds the outer side of the annular projection, so that the structure is simple and compact, has a relatively low cost, is easy to process; has a strong resistance to torsion, a long service life; and a relatively high strength due to being casted integrally.

(3) The structure is simple and easy to maintain and install; has a high strength and a long service life.

(4) The spherical hinge connecting structure is simple in structure, easy to install and maintain; improves greatly the connection strength of the spherical hinge connecting structure, thus has a relatively high connection strength, and a long service life; can prevent effectively the metal core main shaft of the spherical hinge from moving left or right in the elastic member; and the arrangement of the buffer holes can play a buffering effect on the acting force.

(5) The connection of the rear beam and the rear frame has a strong rigidity and is easy to produce; the arrangement of the wire holes facilitates the installation of the wires, pipes and so on of the articulated system.

To sum up, the articulated chassis system of large articulated vehicle of the present invention is designed uniquely and skillfully, has a simple and compact structure, is easy to install, so as to enhance the safety, stability and durability of the articulated chassis system of large articulated vehicle, and lower the cost, therefore the present invention is suitable for large-scale popularization.

In the present specification, the present invention has been described according to the particular embodiments. But it is obvious that these embodiments can be modified or changed without departure from the spirit and scope of the present invention. Therefore, the specification and drawings described above are exemplary only and not intended to be limiting.

I claim:

1. An articulated chassis system of large articulated vehicle, comprising a front beam, a spherical hinge connecting structure, a front frame, a turnplate bearing, a rear frame and a rear beam, the front beam being connected with the front frame through the spherical hinge connecting structure, the turnplate bearing comprising an inner ring and an outer ring, the front frame being connected fixedly with the outer ring, the rear frame being connected fixedly with the inner ring, the inner ring and the outer ring rotating around a central axis to one another, the rear frame being connected with the rear beam, wherein, the articulated chassis system of large articulated vehicle further comprises a turning angle sensing means, the turning angle sensing means is arranged between the inner ring or the outer ring and the front frame/the rear frame, the turning angle sensing means comprises an angle sensor, a first angle sensor and a second angle sensor, the angle sensor is arranged fixedly on the inner ring or outer ring, the first angle sensor and the second angle sensor are arranged fixedly on the front frame or the rear frame, and the first angle sensor and the second angle sensor are arranged at two sides of the angle sensor respectively, the first angle sensor and the second angle sensor comprises an alarm end and a mechanical locking end respectively, the respective alarm end of the first or second angle sensor is offset from the angle sensor in a circumferential direction of the inner ring and form an angle relative to a A-A center line of 40°~50°, the mechanical locking end of the first or second angle sensor is offset from the angle sensor in a circumferential direction of the inner ring and form an angle relative to the A-A center line.

2. The articulated chassis system of large articulated vehicle according to claim 1, wherein, the alarm end and the angle sensor form an angle of 47° in the circumferential direction of the inner ring or the outer ring, the mechanical locking end and the angle sensor form an angle of 52° in the circumferential direction of the inner ring or the outer ring.

3. The articulated chassis system of large articulated vehicle according to claim 1, wherein, the turning angle sensing means further comprises a damping sensor, a first damping sensor and a second damping sensor, the damping sensor is arranged on the inner ring, the damping sensor and the angle sensor are arranged on the center line of the articulated system, the first damping sensor and the second damping sensor are arranged on the front frame or the rear frame respectively, and the first damping sensor and the second damping sensor are arranged at two sides of the damping sensor respectively.

4. The articulated chassis system of large articulated vehicle according to claim 3, wherein, the first damping sensor and the second damping sensor comprises a damping end and a hydraulic locking end respectively, the damping end and the damping sensor form an angle of 15°~20° in the circumferential direction of the inner ring or the outer ring, the hydraulic locking end and the damping sensor form an angle of 45°~55° in the circumferential direction of the inner ring or the outer ring.

5. The articulated chassis system of large articulated vehicle according to claim 4, wherein, the damping end and the damping sensor form an angle of 17° in the circumferential direction of the inner ring or the outer ring, the hydraulic locking end and the damping sensor form an angle of 49° in the circumferential direction of the inner ring or the outer ring.

6. The articulated chassis system of large articulated vehicle according to claim 1, wherein the articulated chassis system of large articulated vehicle further comprises a hydraulic damping buffer system, and the hydraulic damping buffer system is arranged between the front frame and the rear frame.

7. The articulated chassis system of large articulated vehicle according to claim 6, wherein the hydraulic damping buffer system includes two hydraulic damping buffer devices arranged left and right symmetrically and a damping buffer control module, each of the hydraulic damping buffer devices includes a piston, a piston rod and a cylinder liner, the piston is arranged in the cylinder liner, and one side of the piston is connected fixedly with the piston rod, the piston rod is connected fixedly with the front frame, the end of the cylinder liner of each of the hydraulic damping buffer devices is connected fixedly with the rear frame, the damping buffer control module is connected with the left damping buffer device and the right damping buffer device.

8. The articulated chassis system of large articulated vehicle according to claim 7, wherein the hydraulic damping buffer device is a hydraulic cylinder, the hydraulic cylinder is divided by the piston into a rod chamber and a rodless chamber, the damping buffer control module includes a first one-way valve, a second one-way valve, a third one-way valve, a fourth one-way valve and an oil reservoir, the rodless chamber is sequentially connected with the third one-way valve and the oil reservoir in series to form a first oil suction circuit, the rod chamber is sequentially connected with the fourth one-way valve and the oil reservoir in series to form a second oil suction circuit; the rodless chamber is sequentially connected with the first one-way valve and the oil reservoir in series to form a first oil discharge circuit, the rod chamber is sequentially connected with the second one-way valve and the oil reservoir in series to form a second oil discharge circuit; at least one hydraulic damping unit is connected in series in each of the first oil discharge circuit and the second oil discharge circuit.

9. The articulated chassis system of large articulated vehicle according to claim 8, wherein the damping buffer control module comprises a rod chamber integrated block and a rodless chamber integrated block arranged independently, the first oil suction circuit and the first oil discharge circuit are arranged inside the rodless chamber integrated block, the second oil suction circuit and the second oil discharge circuit are arranged inside the rod chamber integrated block.

10. The articulated chassis system of large articulated vehicle according to claim 9, wherein the rod chamber integrated block and the rodless chamber integrated block are arranged at two ends of the cylinder liner respectively, a housing is arranged to surround the rod chamber integrated block, the cylinder liner and the rodless chamber integrated block, and the oil reservoir is a sealed space formed between the cylinder liner, the housing, the rodless chamber integrated block and the rod chamber integrated block.

11. The articulated chassis system of large articulated vehicle according to claim 8, wherein the damping buffer control module further comprises a first solenoid valve and a hydraulic damping supercharging unit, the first solenoid valve and the hydraulic damping supercharging unit are connected with each other in parallel and then connected into the first oil discharge circuit and the second oil discharge circuit, the first damping sensor is connected electrically with the first solenoid valve.

12. The articulated chassis system of large articulated vehicle according to claim 11, wherein the damping buffer control module further comprises a relief valve and a second solenoid valve, the relief valve and the second solenoid valve are connected with each other in parallel and then connected into the first oil discharge circuit and the second oil discharge circuit, and the relief valve and the second solenoid valve are located at the downstream position of the first solenoid valve and the hydraulic damping supercharging unit, the second damping sensor is connected electrically with the second solenoid valve.

13. The articulated chassis system of large articulated vehicle according to claim 11, wherein a pressure sensor is arranged at the upstream position of the hydraulic damping supercharging unit in the first oil discharge circuit and the second oil discharge circuit.

14. The articulated chassis system of large articulated vehicle according to claim 9, wherein a pressure measuring port is arranged in the first oil discharge circuit and/or the second oil discharge circuit of the hydraulic cylinder.

15. The articulated chassis system of large articulated vehicle according to claim 1, wherein the turning angle sensing means further comprises a buffer block and a buffer end, the buffer block is arranged on the front frame or the rear frame, the buffer end is arranged on the rear frame or the front frame.

16. The articulated chassis system of large articulated vehicle according to claim 1, wherein the angle sensor is connected electrically with an alarm device.

17. The articulated chassis system of large articulated vehicle according to claim 1, wherein a thickness of the outer ring is less than a thickness of the inner ring.

18. The articulated chassis system of large articulated vehicle according to claim 1, wherein a steel ball raceway is formed in the circumferential direction at a joint of the inner ring and the outer ring, and filled with steel balls inside, the relative rotation of the inner ring and the outer ring is achieved through the steel balls.

19. The articulated chassis system of large articulated vehicle according to claim 1, wherein at least one lubrication port is arranged on the inner ring, a fixing seat is arranged on the rear frame, a centralized lubricator is arranged fixedly on the fixing seat and connected with the lubrication port through a pipe.

20. The articulated chassis system of large articulated vehicle according to claim 1, wherein the rear frame or the front frame includes a bearing support portion and an annular projection, the annular projection is arranged on a upper side of the bearing support portion, the inner ring is mounted on the bearing support portion and surrounds the outer side of said annular projection.

21. The articulated chassis system of large articulated vehicle according to claim 18, wherein the rear frame or the front frame is formed integrally by casting.

22. The articulated chassis system of large articulated vehicle according to claim 1, wherein the spherical hinge connecting structure comprises a spherical hinge bracket structure and a spherical hinge, the spherical hinge bracket structure includes a bracket fixing plate, a first fixing seat and a second fixing seat, the bracket fixing plate is fixed on the front beam, the spherical hinge is inserted movably in the front frame, the first fixing seat and the second fixing seat are arranged at the same side of the bracket fixing plate, a threaded hole is arranged on each of the first fixing seat and the second fixing seat, and grooves are arranged symmetrically on the first fixing seat and the second fixing seat.

23. The articulated chassis system of large articulated vehicle according to claim 20, wherein the spherical hinge comprises a metal core, an elastic member and a support sheet, the elastic member is arranged at the middle position of the outer surface of the metal core, the support sheet is arranged outside of the elastic member, the metal core comprises a metal core main shaft and at least one position-limiting projection, the position-limiting projection is arranged on the outer surface of the metal core main shaft.

24. The articulated chassis system of large articulated vehicle according to claim 23, wherein a plurality of buffer holes are arranged in the elastic member.

25. The articulated chassis system of large articulated vehicle according to claim 21, wherein the spherical hinge connecting structure comprises at least two supporting sheets, the at least two supporting sheets form at least two slots at the joints.

26. The articulated chassis system of large articulated vehicle according to claim 23, wherein the metal core main shaft and the position-limiting projection on the outer surface of the metal core main shaft are formed integrally.

27. The articulated chassis system of large articulated vehicle according to claim 22, wherein a corner of the grooves are round angle structures, a corner of the supporting portions at two ends of the metal core main shaft are round angle structures, and the round angles of the corners of the supporting portions at two ends of the metal core main shaft are larger than those of the corners of the grooves.

28. The articulated chassis system of large articulated vehicle according to claim 22, wherein the width of the groove in the horizontal direction is less than the width of the first fixing seat or the second fixing seat in the horizontal direction, a horizontal reinforcing portion is formed on each of the first fixing seat and the second fixing seat.

29. The articulated chassis system of large articulated vehicle according to claim 22, wherein the depth of the grooves in the vertical direction is less than the thickness of the first fixing seat or the second fixing seat in the vertical direction, a vertical reinforcing portion is formed on each of the first fixing seat and the second fixing seat.

30. The articulated chassis system of large articulated vehicle according to claim 22, wherein an arc stress portion is formed on each of the first fixing seat and the second fixing seat, at the other side of the grooves, and near the bracket fixing plate.

31. The articulated chassis system of large articulated vehicle according to claim 30, wherein a reinforcing rib is arranged on the arc stress portion.

32. The articulated chassis system of large articulated vehicle according to claim 22, wherein the spherical hinge bracket structure is formed integrally by casting.

33. The articulated chassis system of large articulated vehicle according to claim 1, wherein the rear beam comprises a reinforcing portion and connecting portions welded to two ends of the reinforcing portion, a plurality of fixing threaded holes are arranged in the reinforcing portion, the rear frame includes a rear frame connecting portion, corresponding to the fixing threaded holes, a plurality of rear frame threaded holes are arranged on the rear frame connecting portion, the rear frame connecting portion is fixed by inserting bolts into the fixing threaded holes and the rear frame threaded holes respectively.

34. The articulated chassis system of large articulated vehicle according to claim 31, wherein a wire hole is arranged in the reinforcing rib, corresponding to the wire hole, a rear frame wire hole is arranged in a rear frame connecting portion.

35. The articulated chassis system of large articulated vehicle according to claim 31, wherein a plurality of lightening holes are arranged in the reinforcing rib.

36. The articulated chassis system of large articulated vehicle according to claim 31, wherein the reinforcing rib is formed integrally by casting.

37. An articulated chassis system of large articulated vehicle, comprising a front beam, a spherical hinge connecting structure, a front frame, a turnplate bearing, a rear frame and a rear beam, the front beam being connected with the front frame through the spherical hinge connecting structure, the turnplate bearing comprising an inner ring and an outer ring, the front frame being connected fixedly with the outer ring, the rear frame being connected fixedly with the inner ring, the inner ring and the outer ring rotating around a central axis relative to one another, the rear frame being connected with the rear beam, characterized in that, the articulated chassis system of large articulated vehicle further comprises a turning angle sensing means and a hydraulic damping buffer system, the turning angle sensing means is arranged between the inner ring and the front frame, the hydraulic damping buffer system is arranged between the front frame and the rear frame, and the turning angle sensing means is connected electrically with the hydraulic damping buffer system, the hydraulic damping buffer system includes two hydraulic damping buffer devices arranged left and right symmetrically and a damping buffer control module, each of the hydraulic damping buffer devices includes a piston, a piston rod and a cylinder liner, the piston is arranged in the cylinder liner, and one side of the piston is connected fixedly with the piston rod, the piston rod is connected fixedly with the front frame, the end of the cylinder liner of each of the hydraulic damping buffer devices is connected fixedly with the rear frame, the damping buffer control module is connected with the left damping buffer device and the right damping buffer device, the hydraulic damping buffer device is a hydraulic cylinder, the hydraulic cylinders is divided by the pistons into a rod chamber and a rodless chamber, the damping buffer control module includes a first one-way valve, a second one-way valve, a third one-way valve, a fourth one-way valve and an oil reservoir, the rodless chamber is sequentially connected with the third one-way valve and the oil reservoir in series to form a first oil suction circuit, the rod chamber is sequentially connected with the fourth one-way valve and the oil reservoir in series to form a second oil suction circuit; the rodless chamber is sequentially connected with the first one-way valve and the oil reservoir in series to form a first oil discharge circuit, the rod chamber is sequentially connected with the second one-way valve and the oil reservoir in series to form a second oil discharge circuit; at least one hydraulic damping unit is connected in series in each of the first oil discharge circuit and the second oil discharge circuit.

38. The articulated chassis system of large articulated vehicle according to claim 37, wherein the damping buffer control module comprises a rod chamber integrated block and a rodless chamber integrated block arranged independently, the first oil suction circuit and the first oil discharge circuit are arranged inside the rodless chamber integrated bloc, the second oil suction circuit and the second oil discharge circuit are arranged inside the rod chamber integrated block.

39. The articulated chassis system of large articulated vehicle according to claim 38, wherein the rod chamber integrated block and the rodless chamber integrated block are arranged at two ends of the cylinder liner respectively, a housing is arranged to surround the rod chamber integrated block, the cylinder liner and the rodless chamber integrated block, and the oil reservoir is a sealed space formed between the rod chamber integrated block, the cylinder liner and the rodless chamber integrated block and the housing.

40. The articulated chassis system of large articulated vehicle according to claim 37, wherein the damping buffer control module further comprises a first solenoid valve and a hydraulic damping supercharging unit, the first solenoid valve and said hydraulic damping supercharging unit are connected with each other in parallel and then connected into the first oil discharge circuit and the second oil discharge circuit, the first damping sensor is connected electrically with the first solenoid valve.

41. The articulated chassis system of large articulated vehicle according to claim 40, wherein the damping buffer control module further comprises a relief valve and a second solenoid valve, the relief valve and the second solenoid valve are connected with each other in parallel and then connected into the first oil discharge circuit and the second oil discharge circuit, and the relief valve and the second solenoid valve are located at the downstream position of the first solenoid valve and the hydraulic damping supercharging unit, the second damping sensor is connected electrically with the second solenoid valve.

42. The articulated chassis system of large articulated vehicle according to claim 40, wherein a pressure sensor is arranged at an upstream position of the hydraulic damping supercharging unit in the first oil discharge circuit and the second oil discharge circuit.

43. The articulated chassis system of large articulated vehicle according to claim 37, wherein a pressure measuring port is arranged in the first oil discharge circuit and/or the second oil discharge circuit of the hydraulic cylinder.

44. The articulated chassis system of large articulated vehicle according to claim 37, wherein a thickness of the outer ring is less than a thickness of the inner ring.

* * * * *